United States Patent
Hamada et al.

[19]

[11] Patent Number: 6,157,780
[45] Date of Patent: Dec. 5, 2000

[54] CAMERA CAPABLE OF CORRECTING CAMERA-SHAKE

[75] Inventors: Masataka Hamada, Osakasayama; Hisayuki Masumoto, Sakai; Takashi Okada, Osaka; Hiroshi Ootsuka, Toyokawa; Tougo Teramoto, Wakayama, all of Japan

[73] Assignee: Minolta Co., Ltd., Osaka, Japan

[21] Appl. No.: 09/379,617

[22] Filed: Aug. 24, 1999

Related U.S. Application Data

[62] Division of application No. 09/165,646, Oct. 2, 1998, Pat. No. 5,978,601, which is a continuation of application No. 08/696,663, Aug. 14, 1996, Pat. No. 5,832,314, which is a continuation of application No. 08/370,293, Jan. 9, 1995, Pat. No. 5,561,485, which is a division of application No. 08/062,950, May 18, 1993, Pat. No. 5,416,554, which is a continuation of application No. 07/851,887, Sep. 13, 1990, Pat. No. 5,266,981.

[30] Foreign Application Priority Data

Sep. 14, 1989 [JP] Japan ................................. 1-238690

[51] Int. Cl.[7] .................................................. G03B 17/00
[52] U.S. Cl. ............................. 396/55; 396/213; 348/208
[58] Field of Search ................................ 396/52–55, 213; 348/208

[56] References Cited

U.S. PATENT DOCUMENTS

| | | |
|---|---|---|
| 4,623,930 | 11/1986 | Oshima et al. . |
| 4,733,258 | 3/1988 | Kojima . |
| 4,774,538 | 9/1988 | Kawai . |
| 4,792,820 | 12/1988 | Norita et al. . |
| 4,860,045 | 8/1989 | Hamada et al. . |
| 4,965,519 | 10/1990 | Shikaumi et al. . |
| 4,970,540 | 11/1990 | Vasey et al. . |
| 5,101,230 | 3/1992 | Shikaumi et al. . |
| 5,109,249 | 4/1992 | Kitajima . |
| 5,192,964 | 3/1993 | Shinohara et al. . |
| 5,198,856 | 3/1993 | Odaka et al. . |
| 5,210,563 | 5/1993 | Hamada et al. . |
| 5,220,375 | 6/1993 | Ishida et al. . |
| 5,237,365 | 8/1993 | Miyazawa . |
| 5,266,981 | 11/1993 | Hamada et al. ........................ 396/55 |
| 5,606,456 | 2/1997 | Nagata et al. . |

FOREIGN PATENT DOCUMENTS 62-47012  1/1987  Japan .

*Primary Examiner*—David M. Gray
*Attorney, Agent, or Firm*—Burns, Doane, Swecker & Mathis, LLP

[57] ABSTRACT

A camera comprises an angular velocity sensor for detecting camera-shake. The angular velocity sensor takes a certain time to be stabilized after its operation is started. When correction of camera-shake is required during the certain period, it is displayed that correction of camera-shake is not possible. As a result, a photographer using the camera with the camera-shake detection sensor refrains from photographing when correction of camera-shake is not possible.

8 Claims, 26 Drawing Sheets

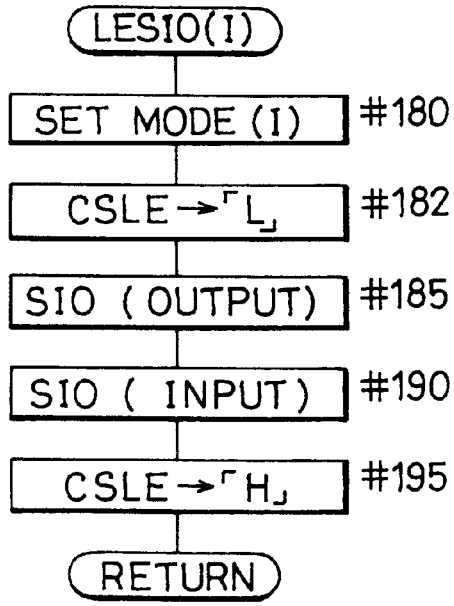
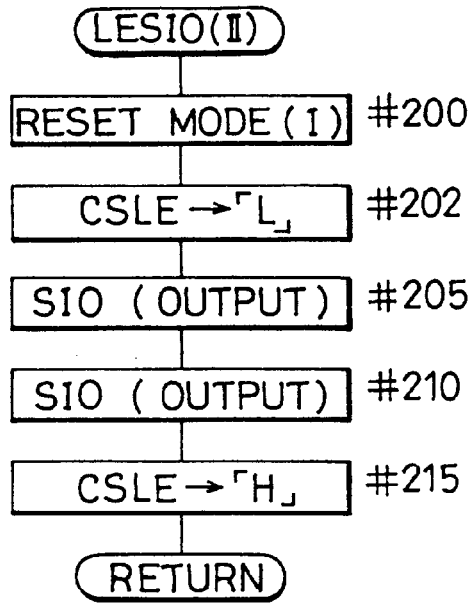
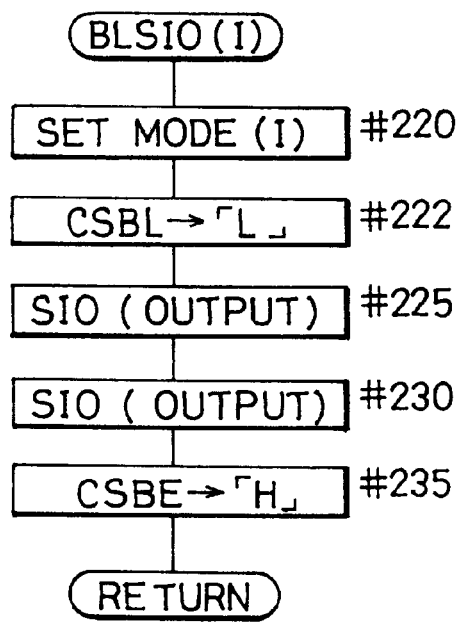
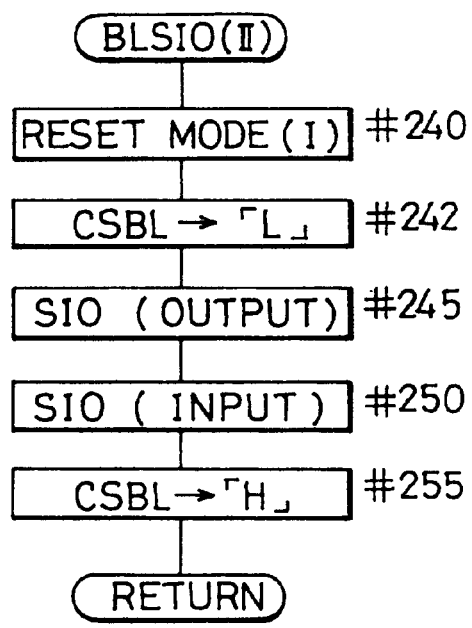

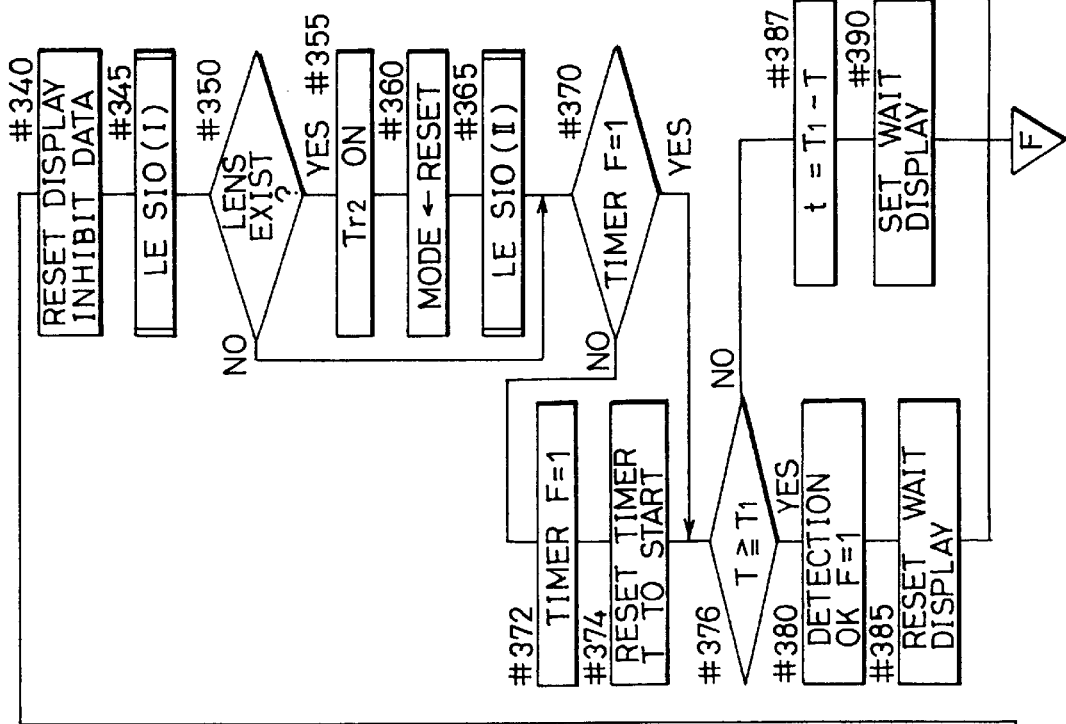
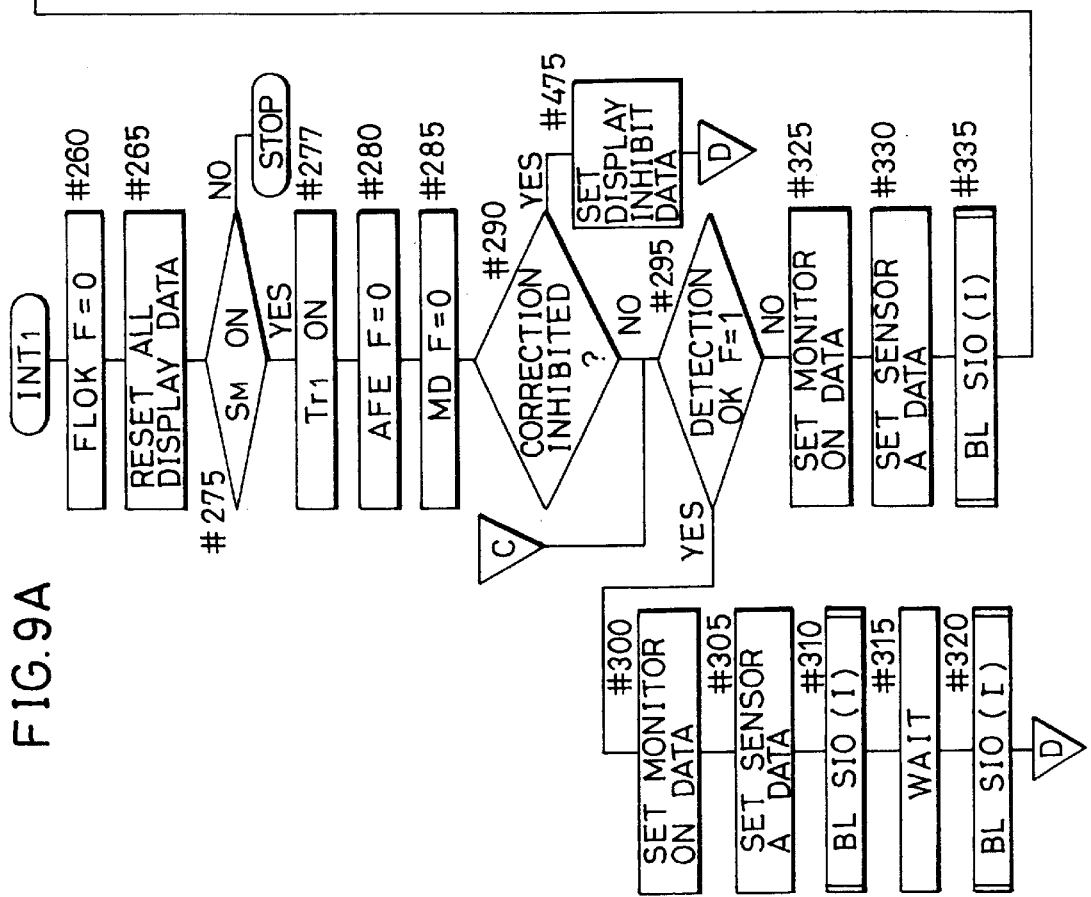
FIG.9A

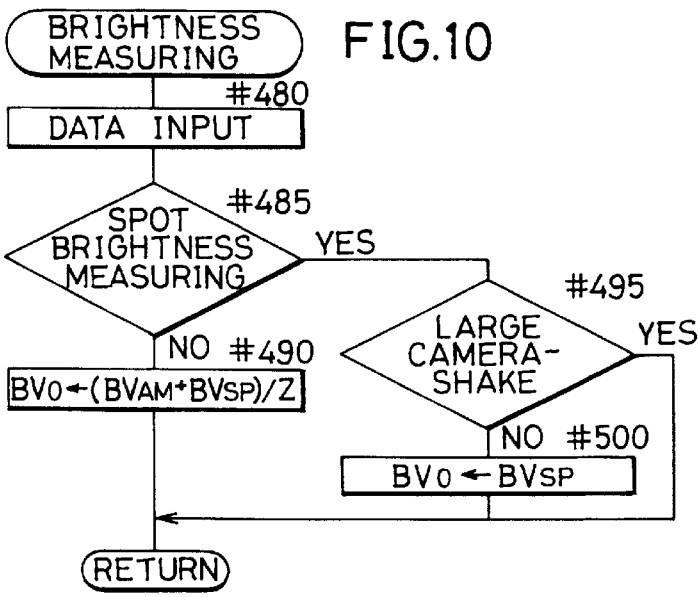
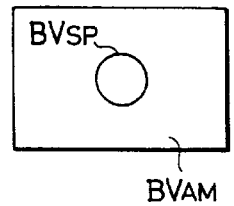
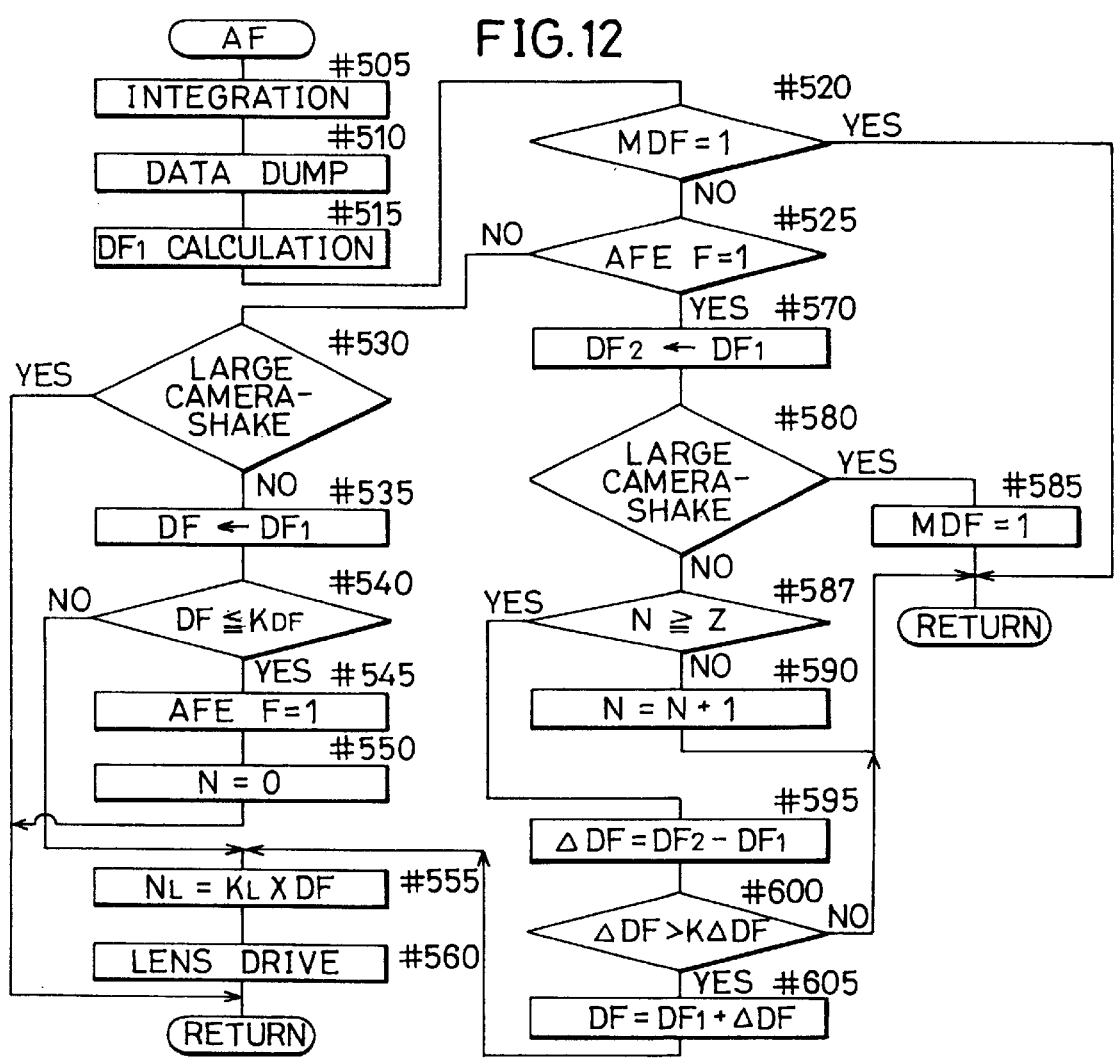

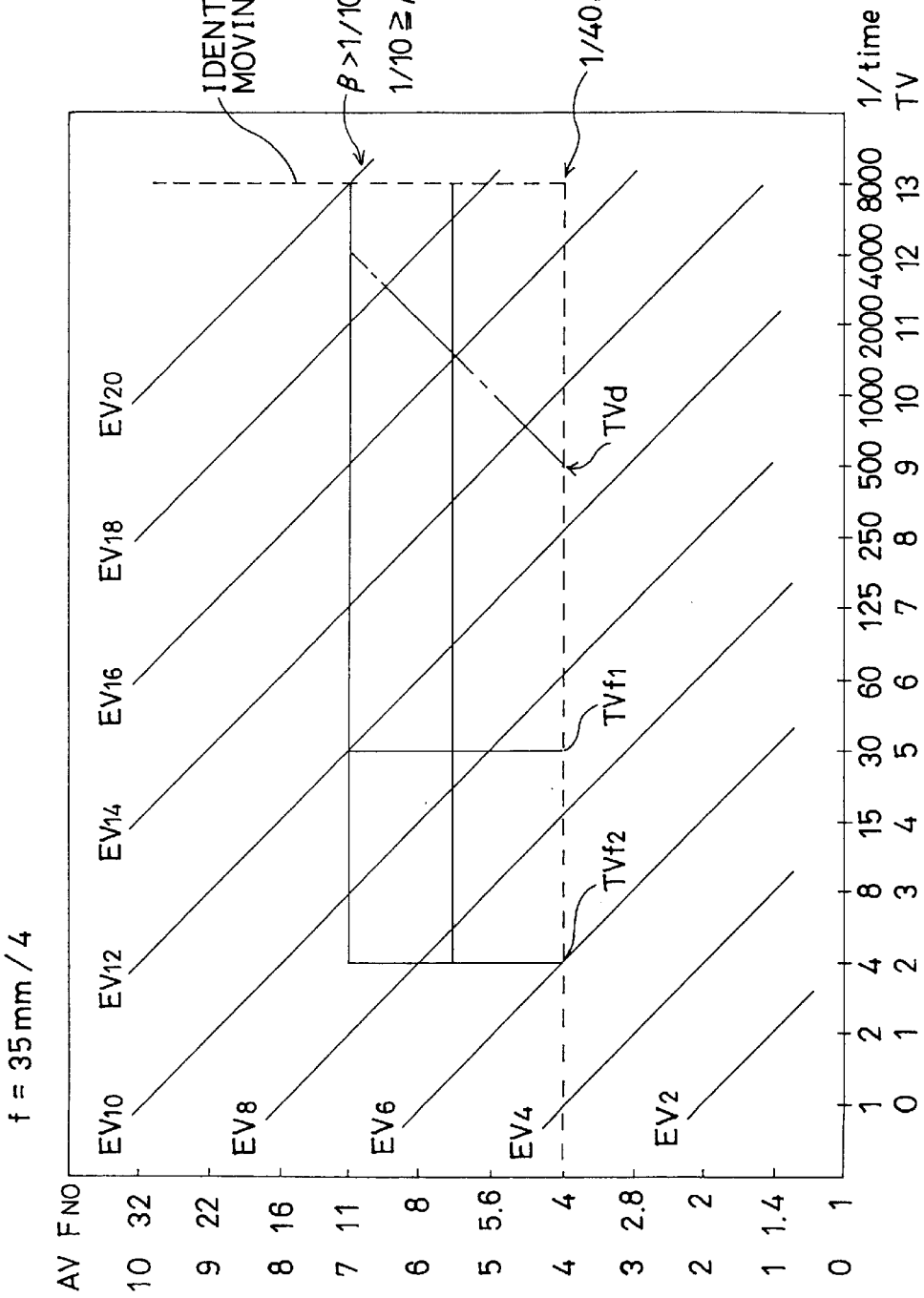

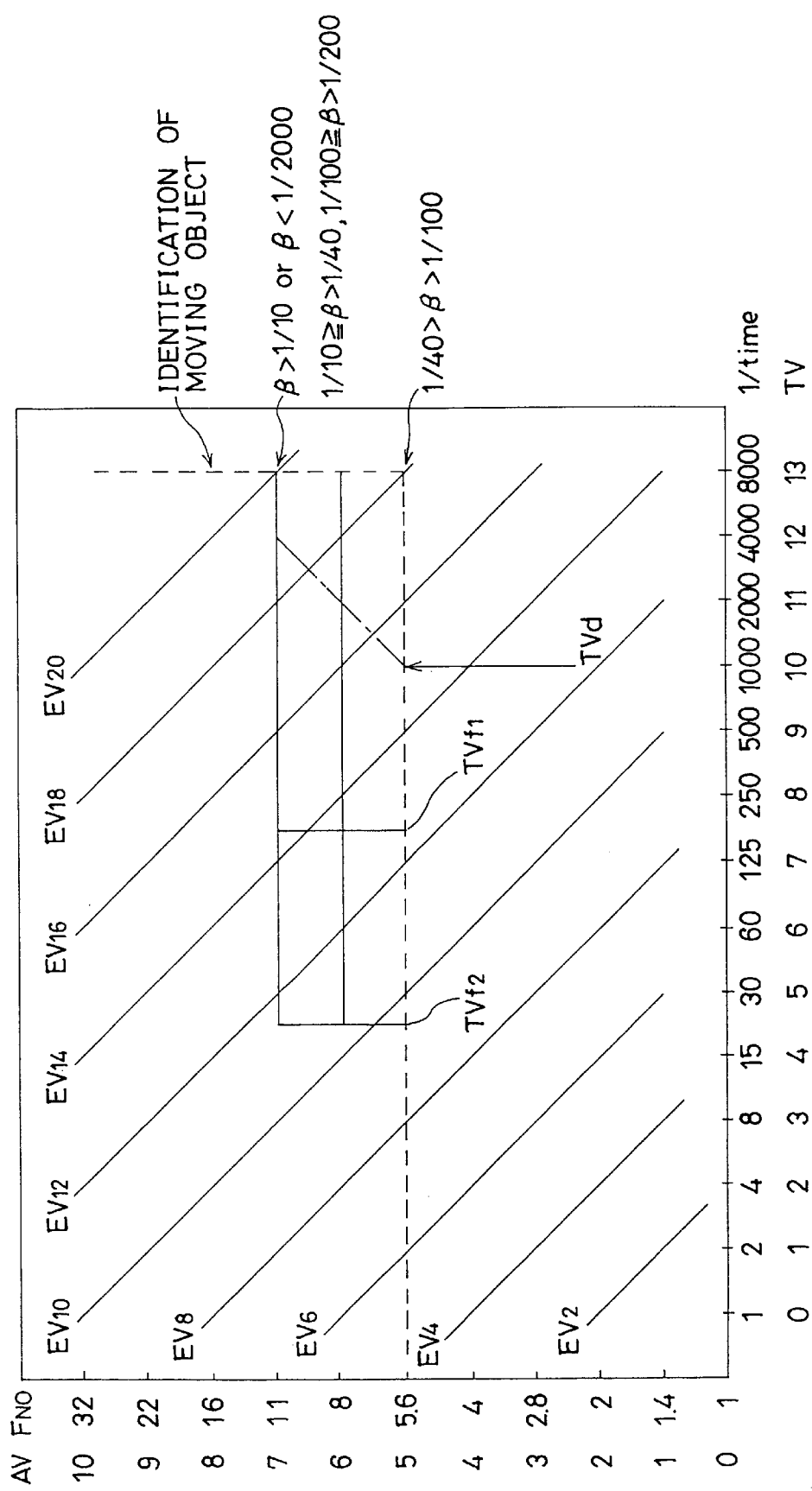

FIG. 17B
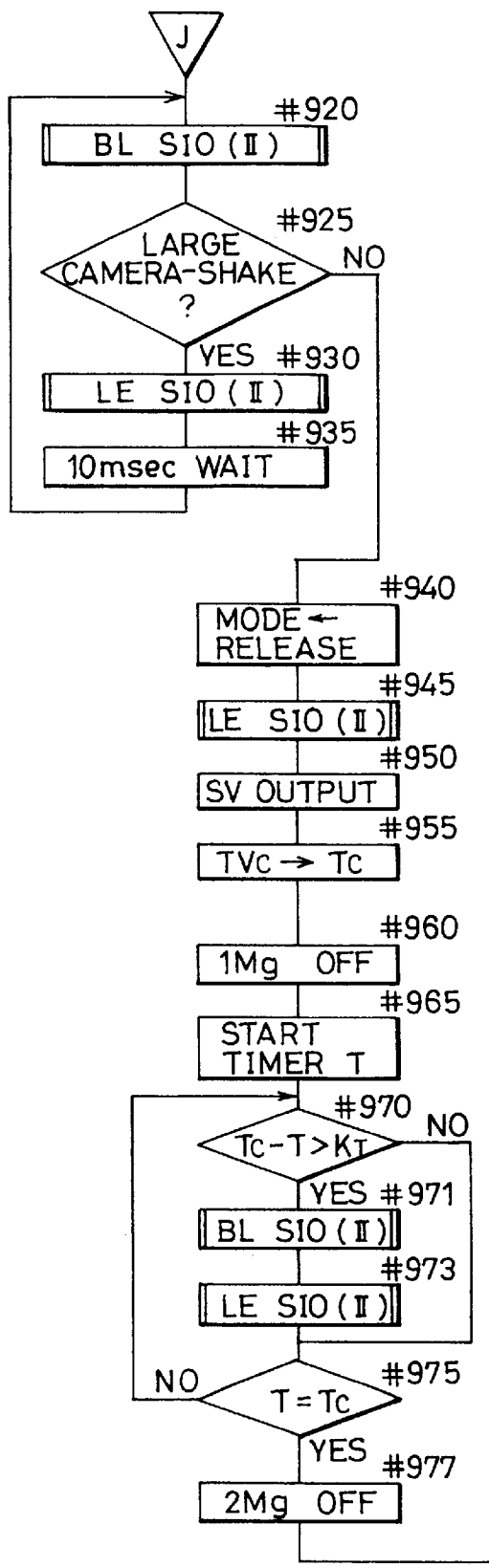
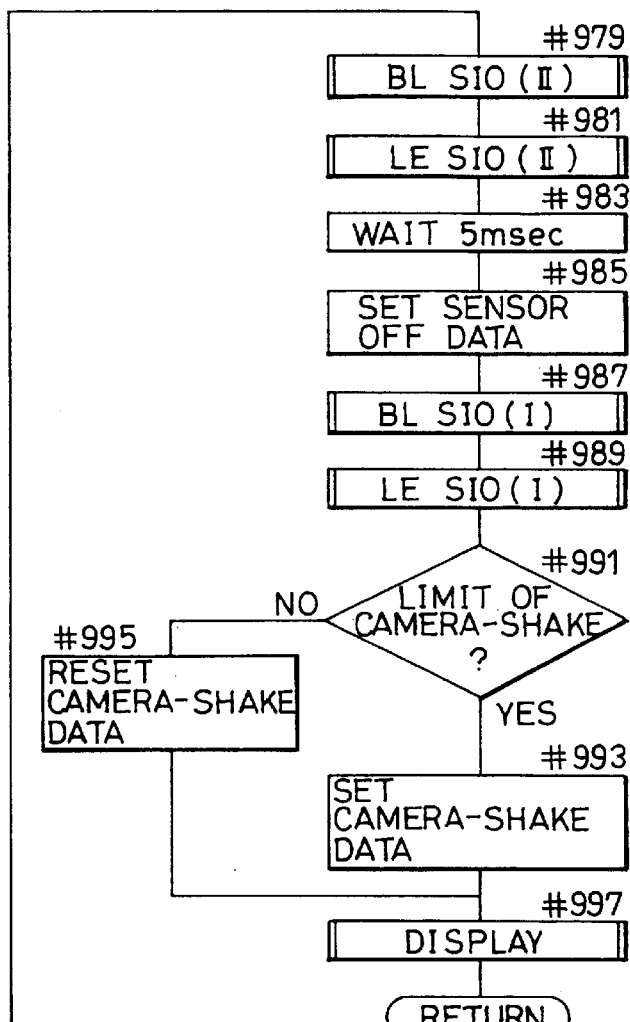

CAMERA CAPABLE OF CORRECTING CAMERA-SHAKE

This application is a divisional of application Ser. No. 09/165,646, filed Oct. 2, 1998, which is a continuation of application Ser. No. 08/696,663, filed Aug. 14, 1996, now U.S. Pat. No. 5,832,314, which is a continuation of application Ser. No. 08/370,293, filed Jan. 9, 1995, now U.S. Pat. No. 5,561,485, which is a divisional of application Ser. No. 08/062,950, filed May 18, 1993, now U.S. Pat. No. 5,416,554, which is a continuation of application Ser. No. 07/581,887, filed Sep. 13, 1990, now U.S. Pat. No. 5,266,981.

BACKGROUND OF THE INVENTION

1. Field of the Invention

The present invention generally relates to cameras, and more particularly, to a camera having a camera-shake detector which detects camera-shake occurring when a picture is taken.

2. Description of the Related Arts

Some conventional cameras have been proposed with camera-shake detecting sensors which detect camera-shake to prevent pictures being blurred. A conventional camera provided with a camera-shake detecting sensor comprises a camera-shake detecting sensor, a correcting device for correcting camera-shake amount in response to output of detection, and a display unit for making display of a warning that a picture is being blurred.

A conventional camera which can correct camera-shake is responsive to output of camera-shake detecting sensor for correcting camera-shake amount so as to allow unblurred pictures to be taken and at the same time, display that unblurred picture are being taken.

Conventional cameras with camera-shake sensors are configured as described above. Therefore, the conventional cameras with camera-shake sensors make correction of camera-shake and at the same time, give a display that camera-shake is corrected.

However, it takes time for the camera-shake sensors to become able to provide stable output of camera-shake detection after the sensors are turned on. Accordingly, the output of the sensors can not be used until stabilized. Therefore, pictures taken before the sensors are stabilized can not be subjected to camera-shake correction. As a result, even those cameras provided with camera-shake sensors and correction mechanism may produce blurred pictures without operating such mechanism in such a case.

SUMMARY OF THE INVENTION

An object of the present invention is to take reliably unblurred pictures using a camera with a camera-shake sensor.

Another object of the present invention is to eliminate unnecessary continuous driving of a taking lens in a camera with a camera-shake sensor.

Still another object of the present invention is to more precisely correct camera-shake in a camera with a camera-shake sensor.

According to the present invention, the objects described above can be achieved by a camera comprising the following elements. That is, a camera according to the present invention comprises a camera-shake detector for detecting camera-shake occurring when a picture is taken, a correction device for correcting camera-shake in response to output of the camera-shake detector, and a warning display unit for displaying a warning when the camera-shake detector is not operating.

Camera-shake detecting means can not detect camera-shake amount immediately after a signal for starting its operation is entered. Therefore, when such a camera-shake detector is in an inoperable state, a warning that the camera can not make camera-shake correction is displayed at a warning display portion. Then, a photographer can recognize that the camera-shake correction device is not operating and thus, does not start photographing until output of the camera-shake sensor is stabilized. As a result, it becomes possible to take reliably unblurred pictures using the camera with a camera-shake sensor.

In a camera according to the present invention, lens driving for camera-shake correction is detected when the camera-shake amount is large in the out-of-focus state. When the camera-shake amount is large in the out-of-focus state, the in-focus state can not be easily realized even if a taking lens is driven. According to the present invention, driving of a taking lens is inhibited when the camera-shake amount is large in the out-of-focus state. Therefore, unnecessary driving of the taking lens is eliminated in the camera with a camera-shake sensor.

According to the present invention, the camera-shake amount of a moving object is estimated using a plurality of camera-shake data. Accordingly, a precise camera-shake correction can be made in a camera with a camera-shake sensor even when an object is in motion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 7 are flow chart diagrams showing operation of the camera system according to the present invention.

FIGS. 9A to 13C are flow chart diagrams for explaining operation of a camera according to the present invention.

FIGS. 14A and 14B are diagrams showing an AE program.

FIGS. 17A and 17B are flow chart diagrams for explaining operation of a camera system according to the present invention.

DESCRIPTION OF THE PREFERRED EMBODIMENT

In the following, embodiments of the present invention will be described with reference to the accompanying drawings. Meanwhile, the description below is made not only on system of the present invention but on the entire system including those parts or functions that have no direct relation with the present invention.

Figure 1:
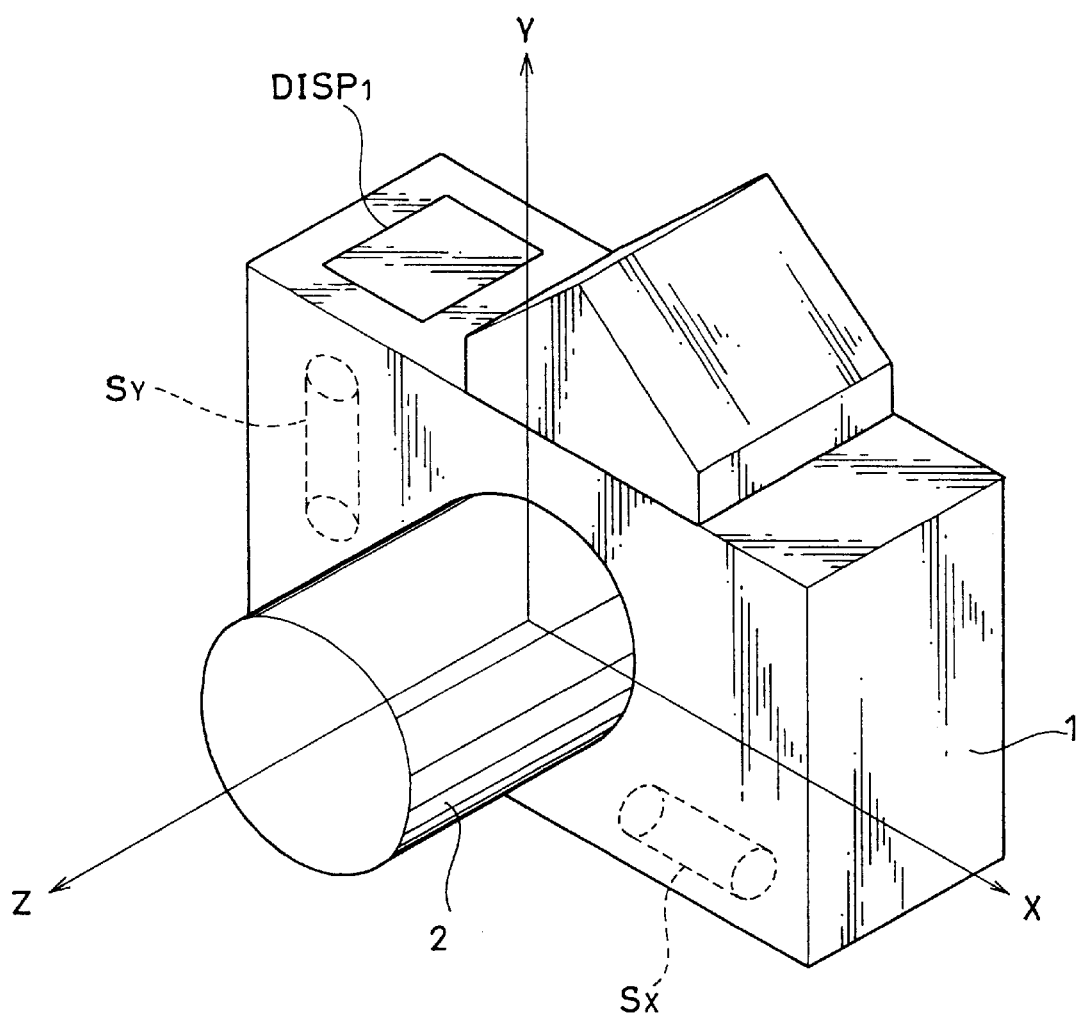
FIG. 1 is a schematic perspective view of a camera system according to the present invention.

FIG. 1 is a schematical perspective view of a camera having a camera-shake detecting sensor according to the present invention. Referring to FIG. 1, the camera according to the present invention comprises camera body 1 and lens 2 interchangeably provided to camera body 1. Camera body 1 comprises X direction camera-shake sensor Sx for detecting camera-shake amount in the X direction in the figure, Y direction camera-shake sensor Sy for detecting camera-shake amount in the Y direction, and display portion $DISP_1$ for giving a warning when X direction and Y direction camera-shake sensors Sx and Sy are not in the operating state.

Figure 2:
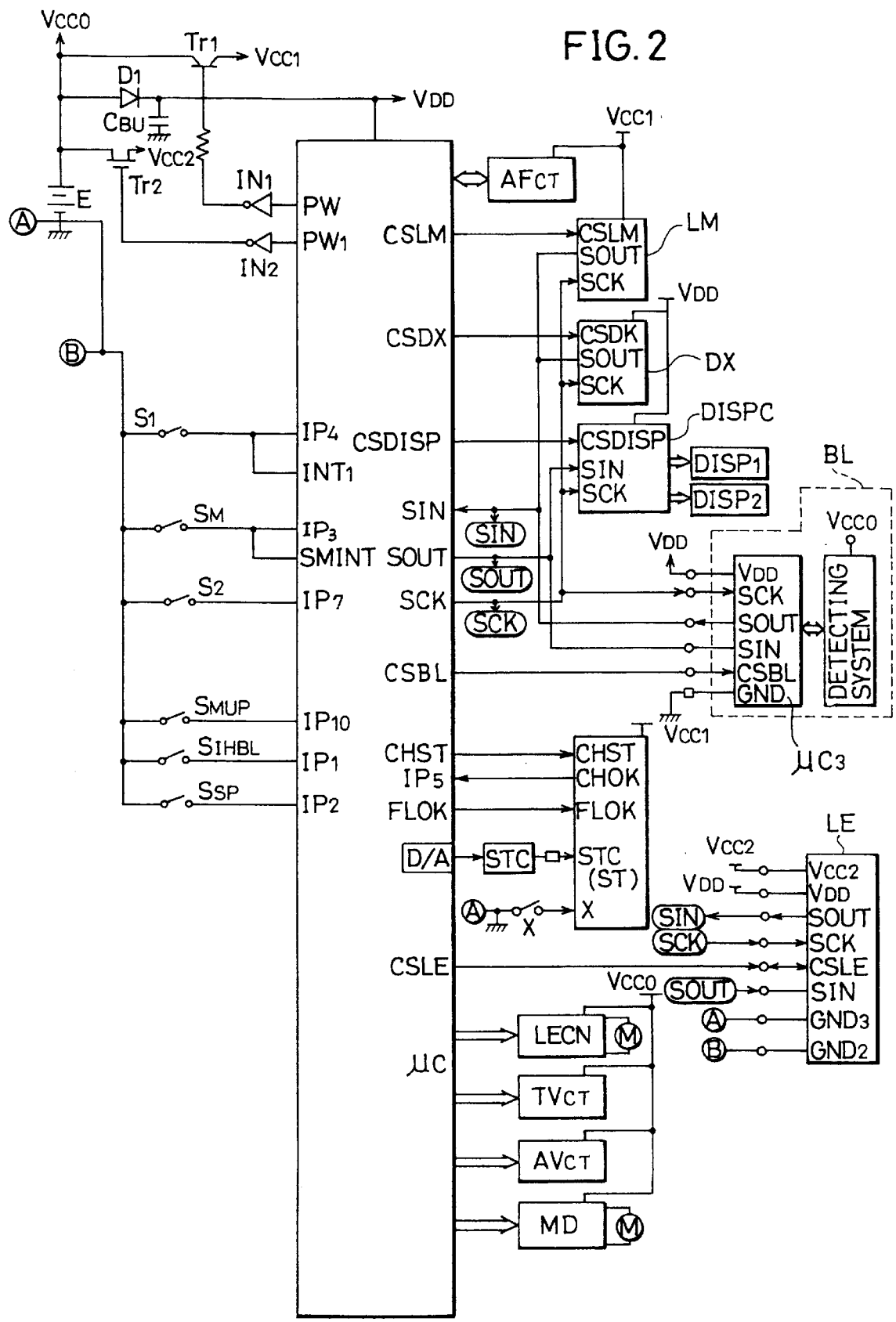
FIG. 2 is a circuit block diagram of a camera body according to the present invention.

FIG. 2 is a block diagram showing a circuit of a camera according to the present embodiment. Referring to FIG. 1, the camera according to the present invention comprises a microcomputer μC which controls the entire camera and performs various operations, and has focus detecting circuit $AF_{CT}$ connected thereto. Focus detecting circuit $Af_{CT}$ comprises CCD, an integration control circuit, and an A/D converting circuit, and gets information of an object from a focus detection area as will be described later and A/D converts the information to output the result to microcomputer μC. The main parts shown in the circuit block of a camera according to the present invention will be described below.

Brightness measuring circuit LM measures brightness in two areas described later and A/D converts the measured brightness values to output the results to microcomputer μC as brightness information. Display control circuit DISPC receives a display control signal from microcomputer μC to display a predetermined information in display portions $DISP_1$ on the upper surface of the camera body and $DISP_2$ in a finder. Camera-shake detector BL detects camera-shake as will be described later in detail.

Microcomputer μC is connected to electronic flash device ST, brightness adjusting circuit STC which receives light reflected from an object through an unshown taking lens at an emission of flash and stops the emission of flash when an appropriate exposure amount is reached, and lens circuit LE which outputs information specific to an interchangeable lens to microcomputer μC and drives an actuator for correction (a pulse motor in the present embodiment) as will be described later, based on correction amount information for camera-shake correction received from the camera. Further, microcomputer μC is connected to lens driving control circuit LECN for driving a taking lens based on focus detecting information, shutter control circuit $TV_{CT}$ for controlling shutter based on a control signal from microcomputer μC, aperture control circuit $AV_{CT}$ for controlling aperture based on a control signal from microcomputer μC, motor control circuit MD for winding and controlling a film based on a control signal from microcomputer μC, battery E serving as power source, reverse-current preventing diode $D_1$, large-capacity condenser $C_{BU}$ for backing up microcomputer μC, power supply transistor Tr1 for supplying power to part of the above-described circuits, field-effect transistor FET (Tr2) for supplying power to a motor for camera-shake correction.

In the following, description will be made on switches. Brightness measuring switch S1 is used to perform various operations of camera (for example, brightness measuring and display of various data) including automatic focusing operation (referred to as "AF" hereinafter), and turned on when an unshown release button is depresssed at a first stroke. When light measuring switch S1 is turned on, microcomputer μC executes an interruption flow $INT_1$ shown in FIG. 9A, as will be described later. Main switch $S_M$ puts the camera in the operable state when turned on. When this switch is turned on/off, interruption SMINT described later is performed. Switch $S_{IHBL}$ is one for inhibiting camera-shake correction and switch $S_{SP}$ is one for switching brightness measuring modes (spot/average). Release switch S2 is handled when a picture is taken, and turned on when the release button is depressed at a second stroke (deeper than the first stroke). Switch X is a so-called X contact, and turned on when a travel of preceding shutter curtain is completed and turned off when an unshown release member is charged.

Figure 3:
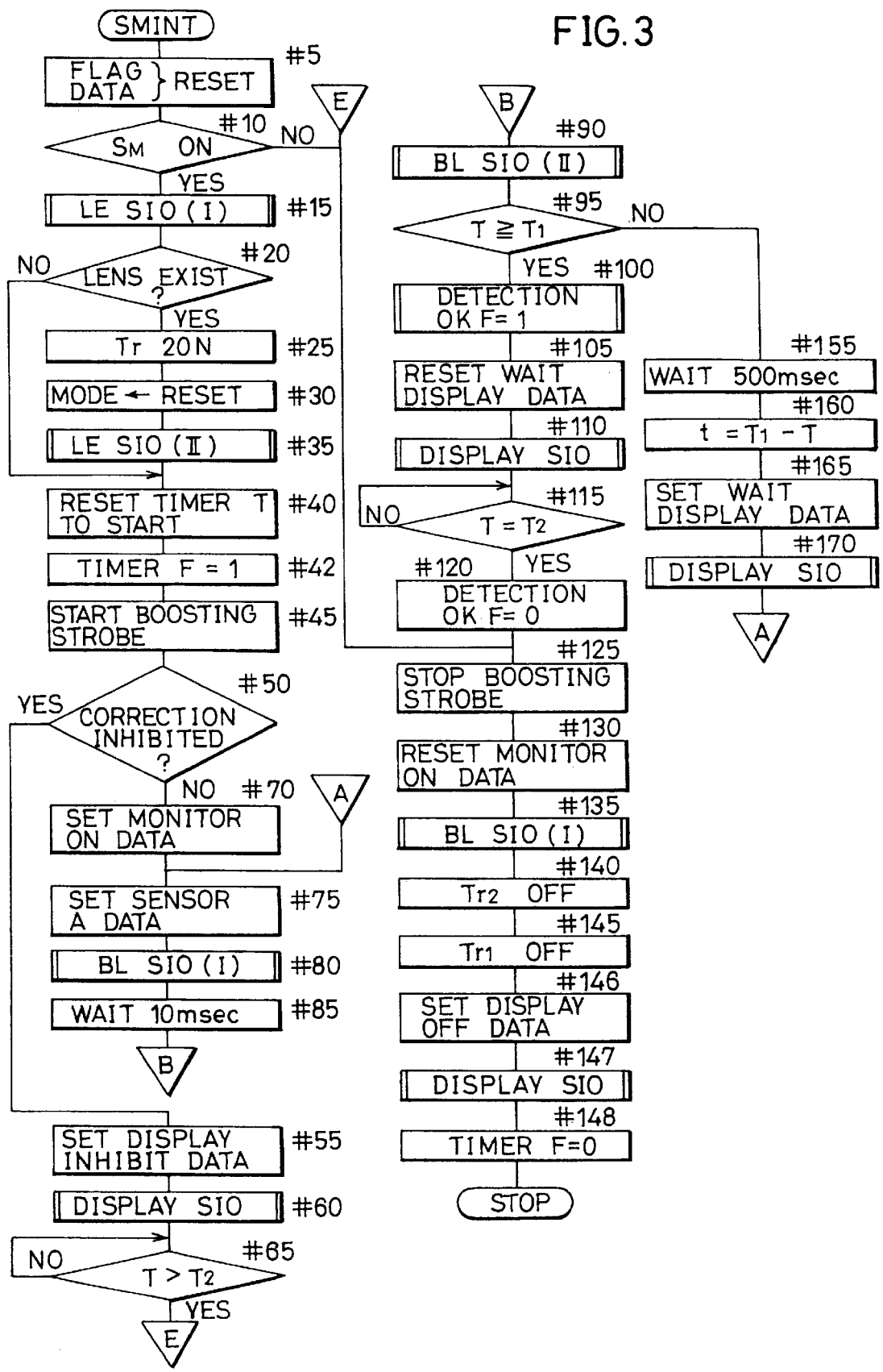

FIG. 3 is a flow chart diagram showing the interruption SMINT which is performed when main switch $S_M$ is turned on/off. Referring to FIG. 3, when this interruption is to be made, first, microcomputer μC resets all flags and data (to 0) (step #5) (in the following, the designation of step will not be repeated). Then, determination is made as to whether main switch $S_M$ has been turned on or not. When the switch has been turned on, data is entered from the lens (#10 and #15). In this embodiment, the data includes focal length f, coefficient $K_L$ for converting defocus amount into lens driving amount, object distance DV, fully open aperture value $AV_0$ and a data representing presence or absence of lens.

FIG. 4 is a flow chart diagram showing the subroutine of data input at #15 shown in FIG. 3. Referring to FIG. 4, in the subroutine of data input, data indicative of mode (I) (data input) is set (#180), potential at terminal CSLE is set to the L level (#182), the data set as described above is output (#185), the above-described data such as focal length f are entered from the lens (#190), and then potential at terminal CSLE is set to the H level (#195). It is to be noted that the mode (I) is a control mode for the lens, subroutine LESIO (I) denoted in FIG. 4 represents data input to the camera, and LESIO (II) shown in FIG. 5 is a mode for outputting data from the camera.

Turning back to the flow chart of FIG. 3, determination is made, based on the data entered from the lens, as to whether a lens has been mounted or not (#20). When one has been mounted, potential at terminal PW1 is set to the H level so as to turn transistor Tr2 on (#25). Thus, power is supplied to the driving motor for camera-shake correction. Data for resetting a camera-shake correction is set and then the data is output to the lens according to subroutine LESIO (II) (#35). The output data includes shake amount in the X direction ΔX, shake amount in the Y direction ΔY and a data representing mode (reset/release/OFF).

Subroutine LESIO (II) for outputting data from the camera body to the lens will be described with reference to FIG. 5. First, data of mode (I) is reset (#200), voltage at terminal CSLE is set to the L level (#202), and the above-described mode signal, i.e., mode (II) is output (#205). Thereafter, the above-described output data is output (#210), potential at terminal CSLE is set to the H level (#215), and then the program returns to the main routine.

Subsequently, the operation proceeds to #42 in FIG. 3 (even in the case that determination has been made at #20 that lens is absent, the program proceeds up to this step), timer T is reset to start, a timer flag F1 indicative thereof is set, and then potential at terminal CHST is set to the H level to start boosting of the electronic flash device ST (#40 to #45). Thereafter, determination is made as to whether correction inhibit switch $S_{IHBL}$ for inhibiting camera-shake correction has been turned on or not (#50). When the correction inhibit switch $S_{IHBL}$ has been turned on (correction is inhibited), data for inhibiting display is set (#55) and the data is output to the display control circuit (#60) so as to turn off the display indicating that camera-shake correction is being made. Thereafter, the system waits until value of timer T reaches T2 (about 5 minutes) (#65), and then the program proceeds to step #125. At step #125, the boosting of the electronic flash device ST is stopped, potential at terminal CHST is set to the L level, data for turning on an angular velocity monitor is reset and a signal indicative thereof is output to camera-shake detector BL to turn off the monitor (#125 to #135). Then, power supply transistors Tr2 and Tr1 are turned off, display data is set, and a signal indicative thereof is output to the display circuit to turn off the display. Thereafter, a timer flag (timer F) is reset and then the microcomputer stops its operation (#140 to #148).

At step #50, when the switch for inhibiting correction has not been turned on, the program proceeds to step #70, where data for turning on the angular velocity monitor is set. Then, a sensor mode A is selected and data indicative thereof is set and output to camera-shake detector BL (#76 to #80). Meanwhile, there are two sensor modes A and B. In the sensor mode A, the angular velocity monitor for detecting camera-shake is turned on only for a predetermined time, and in the sensor mode B, the angular velocity sensor is always in the on-state. The purposes of providing the two sensor modes are to reduce consumption current and also to make the angular velocity sensor work only when it is required as in taking a picture.

Next, contents of the subroutine BLSIO (I) shown at step #80 will be described, where data is output to camera-shake detector BL. The data output at this step is as follows.

angular velocity monitor: ON/OFF sensor mode: A, B, OFF focal length: f object distance data: DV FIG. 6 is a flow chart diagram showing the subroutine. Referring to FIG. 6, in the subroutine BLSIO (I) where data is output to the camera-shake detector, first, data mode is set to mode (I) for data input, potential on terminal CSBL is set to the L level (#220 and #222), and then the data is output (#225). Subsequently, data indicative of whether the above-mentioned angular velocity monitor has been turned on/off is output, potential on terminal CSBL is set to the H level, and then the program returns to the main routine (#230 and #235).

Returning now to the flow chart shown in FIG. 3, the system waits until the angular velocity sensor is stabilized to start measuring and then data therefor is entered (#85 and #90). The data output from the camera is as follows.

$\Delta X_{BL}$: correction amount in the X direction $\Delta Y_{BL}$: correction amount in the Y direction :camera-shake amount is large/not large FIG. 7 is a flow chart diagram showing the subroutine BLSIO (II) at step #90 shown in FIG. 3, where camera-shake amount is output from camera to lens. Referring to FIG. 7, in the subroutine BLSIO (II), data of mode (I) is reset (returning to mode (II) indicative of data output), potential on terminal CSBL is set to the L level and data indicative thereof is output (#240 to #245). Subsequently, data from camera-shake detector BL is entered in microcomputer $\mu C$, potential on terminal CSBL is set to the H level, and then the program returns to the main routine (#250 and #255).

Turning back to the flow chart shown in FIG. 3, determination is made as to whether the above-mentioned timer T indicates no less than T1 (about 7 seconds, corresponding to the time taken for the angular velocity sensor to be stabilized) or not. When $T \geq T1$, it is determined that the angular velocity sensor has been stabilized, and then a flag indicative thereof (detection OKF) is set, data indicative of a WAIT display is reset, and data is output to the display circuit (#100 to #110).

The reason why the system waits for the angular velocity sensor to be stabilized is that when power is supplied to the sensor, data representing a correct shake amount can not be output immediately. This is true particularly when a vibration-type angular velocity sensor is employed.

Figure 8A:
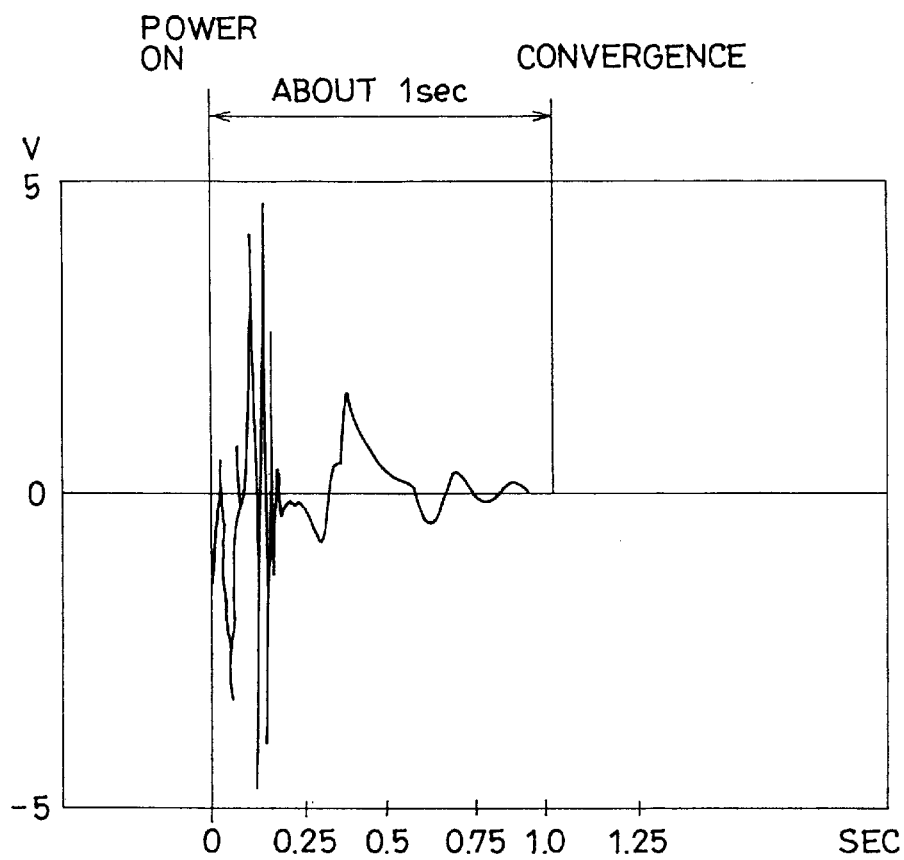
FIGS. 8A and 8B are diagrams showing performance of a camera-shake sensor according to the present invention.
Figure 8B:
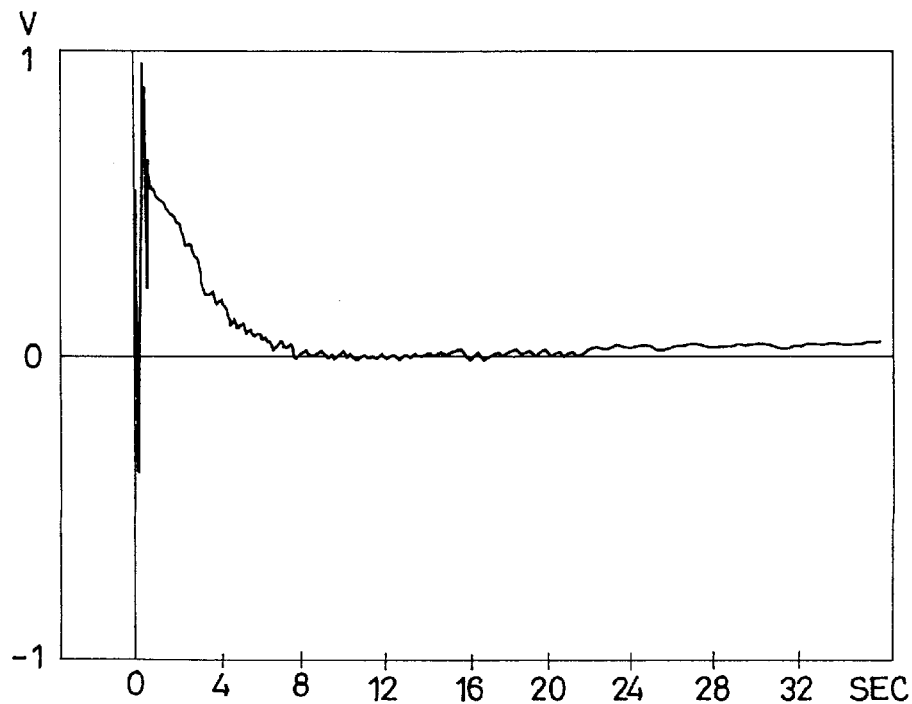

In FIGS. 8A and 8B, there are shown times required for output of the angular velocity sensor to be stabilized after power is turned on. In FIG. 8A, it takes about one second for the stabilization of output after power is turned on, while in the example shown in FIG. 8B, it takes about 8 seconds for the stabilization of output. In consideration of the level to be used, a maximum waiting time of 7 seconds is set in the present invention.

Turning back to the flow chart shown in FIG. 3, when T=T2 in timer, detection OK flag OKF is reset to turn off the camera and the flow following the above-described step 125 is executed (#115 and #125).

At step #95, when timer T has not yet reached T1, the program proceeds to step #125 and the system waits for 500 m seconds. Thereafter, t is made equal to T1−T, data of WAIT display is set and the above-mentioned t and the data of WAIT display are output to the display control circuit, and then the program proceeds to step #75 (#115 to #170).

As described above in connection with steps #95 to #110 and #115 to #170, according to the present invention, a display that photographing is "waited" is made after the turning-on of main switch SM until time T1 taken for the angular velocity sensor to be stabilized has passed. When the time taken for the angular velocity sensor to become stable has passed, the display is reset. As a result, a photographer can determine whether the angular velocity sensor for detecting camera-shake is operating or not. Therefore, when the camera-shake detecting sensor is not operating, pictures are not taken, thus preventing blurred pictures being taken.

Figure 9B:
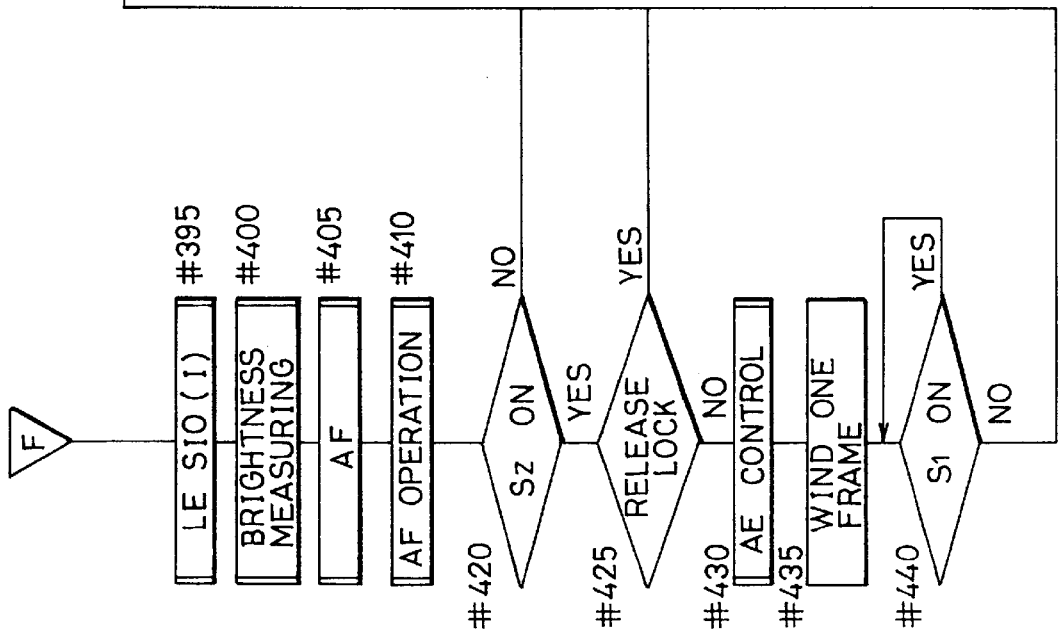

Subsequently, a program executed when brightness measuring switch S1 is turned on will be described below. FIG. 9A is a flow chart diagram showing the program executed when brightness measuring switch S1 is turned on. First, potential on terminal FLOK for indicating that flash emission is possible is set to the L level, and all display data is reset (#260 and #265). Then, determination is made as to whether main switch $S_M$ has been turned on or not. If the switch has been turned off, microcomputer $\mu C$ stops (#275). If the switch has been turned on, transistor Tr1 is turned on to supply power to brightness measuring and AF circuits and the like, flag AFEF indicating the in-focus state and flag MDF indicating that camera-shake amount is large after the in-focus state is achieved are reset, and then determination is made as to whether the correction inhibit switch has been turned on or not (#280 to #290). When correction inhibit switch $S_{IHBL}$ has been turned on at step #290, the program proceeds to step #475 to set display inhibit data and further proceeds to step #395 to execute the flow following thereafter (#475), details of which will be described later.

When the correction inhibit switch has been turned off at step #290, the program proceeds to step #295 and determination is made as to whether a flag indicating that the angular velocity sensor can perform detection, or detection OK flag OKF has been set or not. When the flag has been set, the program proceeds to step #300 to set data of monitor ON. Subsequently, a flag indicating that the sensor is in the A mode is set, data indicative thereof is output to camera-shake detector BL, and then the system waits for a certain time (10 m second). Thereafter, data of camera-shake amount is entered from the above-mentioned detector BL and the program proceeds to step #395 (#305 to #320). From the original purpose of correcting camera-shake which takes place at the time of exposure, operation of the camera-shake detecting sensor may not be started until release switch S2 is turned on. However, if the switch of the camera-shake detector is turned on before release switch S2 is turned on, as shown in this flow, its rising time can be reduced. When the detection OK flag indicating that the angular velocity sensor can perform detection has not been set at step #295, i.e., when the sensor has not yet been stabilized, data indicating that the monitor is ON and data indicating that the sensor is in the A mode are set and output to camera-shake detector BL to reset display inhibit data, and then data is entered from lens (#330 to #345). It is determined from the entered data whether a lens has been mounted or not. When a lens has been mounted, transistor Tr2 is turned on to supply power to the motor for correction on the lens side, lens mode is reset, information indicative thereof is output to the lens, and then the program proceeds to step #370 (#350 to #365). Even when no lens has been mounted at stem #360, the program proceeds also to step #370.

At step #375, determination is made as to whether the timer flag has been set or not. When the flag has been set, the program proceeds to step #376. When the timer flag has not been set, the timer flag is set, timer T is reset to start, and then the program proceeds to step #376 (#370 to #374). At step #376, determination is made as to whether timer T has reached a value no less than T1 or not. When T≧T1, the detection OK flag is set, WAIT display is reset, and the program proceeds to step #395 (steps #376 to #385). On the other hand, when T<T1, it is determined that the angular velocity sensor has not been yet stabilized. Then, operation is made to make t equal to T1−T, WAIT display data is set, and then the program proceeds to step #395.

At step #395, data is entered from lens, brightness is measured, and then AF operation is performed. Exposure operation (AE operation) is performed based on the measured brightness data to stop down aperture, and a shutter speed is found (#400 to #410). Those respective subroutines will be described later.

As described above in connection with steps #376 to #390, according to the present invention, also in an interruption flow where the brightness measuring switch is turned on, WAIT display is made at the display portion of camera after the turning-on of the brightness measuring switch until the angular velocity sensor is stabilized, and after the time taken for the angular velocity sensor to be stabilized has passed, the display is reset. Therefore, as previously described, before the camera-shake detecting sensor becomes stable, it is displayed that the camera-shake detecting sensor has not been yet stabilized. Accordingly, a photographer does not take pictures in such a state. As a result, a camera capable of photographing unblurred pictures can be provided.

Meanwhile, according to the present invention, as shown at step #325, when the detection OK flag indicating that camera-shake can be detected represents NO, ON data is set for the camera-shake detecting monitor. Accordingly, at the same time that the brightness measuring switch is turned on, the sensor circuit of the camera-shake detector is turned on.

Subsequently, the brightness measuring subroutine shown at step #400 in FIG. 9 will be described with reference to FIG. 10. In FIG. 11, there is shown a brightness measuring pattern as viewed from a finder. As shown in FIG. 11, the brightness measuring pattern is composed of two areas; one is spot brightness measuring area $BV_{SP}$ at the center and the other is peripheral brightness measuring area $BV_{AM}$ surrounding the former. Brightness values measured from the respective areas are represented as $BV_{SP}$ and $BV_{AM}$.

Referring to FIG. 10, data of values $BV_{SP}$ and $BV_{AM}$ measured in the respective areas are entered and determination is made as to whether the spot brightness measuring switch has been turned on or not. When the switch has not been turned on, the measured value BV is set to $(BV_{AM}+BV_{SP})/2$ and then the program returns to the main routine (#480 to #490). On the other hand, when the spot brightness measuring switch has been turned on at step #485, determination is made, based on the data entered from camera-shake detector BL, as to whether the camera-shake amount is large or not. When the camera-shake amount is large, the data is not updated but the program returns to the main routine. When the camera-shake amount is small, $BV_{SP}$ is substituted for the measured value BV and then the program returns to the main routine (#495 to #500). The reason why the data is not updated in the case of a large camera-shake amount is that deviation of measured values should be prevented which might take place when a brightness measuring range is shifted due to a momentary camera-shake.

Subsequently, the AF subroutine shown at step #405 in FIG. 9 will be described below. FIG. 12 is a flow chart diagram showing contents of the AF subroutine. Referring to FIG. 12, first, integration of CCD is done, data is entered, and then current defocus amount DF1 is calculated based on the entered DF amount for driving lens (#505 to #515). At step #520, determination is made as to whether flag MDF indicating that camera-shake amount is large after the in-focus state is achieved has been set on or not. If MDF has been set, the program returns immediately to the main routine (#520). Thus, when the camera-shake amount after achievement of the in-focus state is large, determination of a moving object is inhibited and AF lock is made. This is because AF information can not be relied on when the camera-shake amount is large.

On the other hand, when flag MDF has not been set at step #520, determination is made as to whether flag AFEF indicative of the in-focus state has been set or not (#525). When the flag has not been set, determination is made as to whether camera-shake amount is large or not (#530). When the camera-shake amount is large, reliability of the defocus amount is low. Therefore, the program returns to the main routine without driving lens. When the camera-shake amount is not large at step #530, the obtained defocus amount DF1 is set as defocus amount DF for lens drive. When the defocus amount is not below a predetermined value, lens drive amount is taken by multiplying the DF amount by coefficient for converting lens drive amount so as to perform lens drive, and then the program returns to the main routine (#535, #540, #555 and #560). When the defocus amount DF for lens drive is below the predetermined value at step #540, flag AFEF indicative of the in-focus state is set, N is set to 0, and then the program returns to the main routine (#545 and #550).

When flag AFEF indicative of the in-focus state has been set at step #525, the program proceeds to step 570 and the current defocus amount DF1 is changed to DF2. Thereafter, determination is made, based on the data entered from camera-shake detector BL, as to whether the camera-shake amount is large or not (#580). When the camera shake amount is large at step #580, flag MDF indicative thereof is set and the program returns to the main routine (#585). On the other hand, when the camera-shake amount is not large at step #580, determination is made as to whether N is no less than 2 or not. If N<2, it means non-input or input of one data indicative of the in-focus state. Then, since determination of a moving object can not be made, the program returns to the main routine (steps #587 and #590). If N≧2 at step #587, difference between the defocus amounts of the previous and current times is found and then determination is made as to whether the difference is larger than a predetermined value (K ΔDF) or not. If the difference is not larger than the predetermined value, the object is not in motion. Therefore, the program returns to the main routine (#595 and #600). When the difference is larger than the predetermined value, the defocus amount is set as DF=DF1+ΔDF and the program proceeds to step #555 to drive lens (#605).

Subsequently, the subroutine of AE operation shown at step #430 in FIG. 9 and an example of AE program will be described with reference to FIGS. 13A to 14B. In the present embodiment, an object is identified based on magnification data as follows.

β>1/10: macrophotographing

β≦1/200 landscape photographing

1/40≧β>1/100: figure photographing

An intermediate magnification can not be classified into any of the cases above. Further, when β>1/10 and β≦1/200, aperture is stopped down from an open aperture value to about 2EV or 3EV, resulting in an improved photographic performance. Particularly for the landscape photographing, specific consideration is given to depth. In the case of 1/40≧β>1/100, the depth of focus is made shallower in photographing a figure and at the same time, the open aperture value is used as control aperture value so as to reduce camera-shake in photographing a figure.

Further, according to the present embodiment, determination is made as to whether an object is in motion or not. When the object is moving, an AE diagram is employed in which priority is given to aperture as in the above-mentioned diagram of AE program and shutter speed is also taken into consideration so as not to allow blurring of the object to be caused by the movement.

Figure 13A:
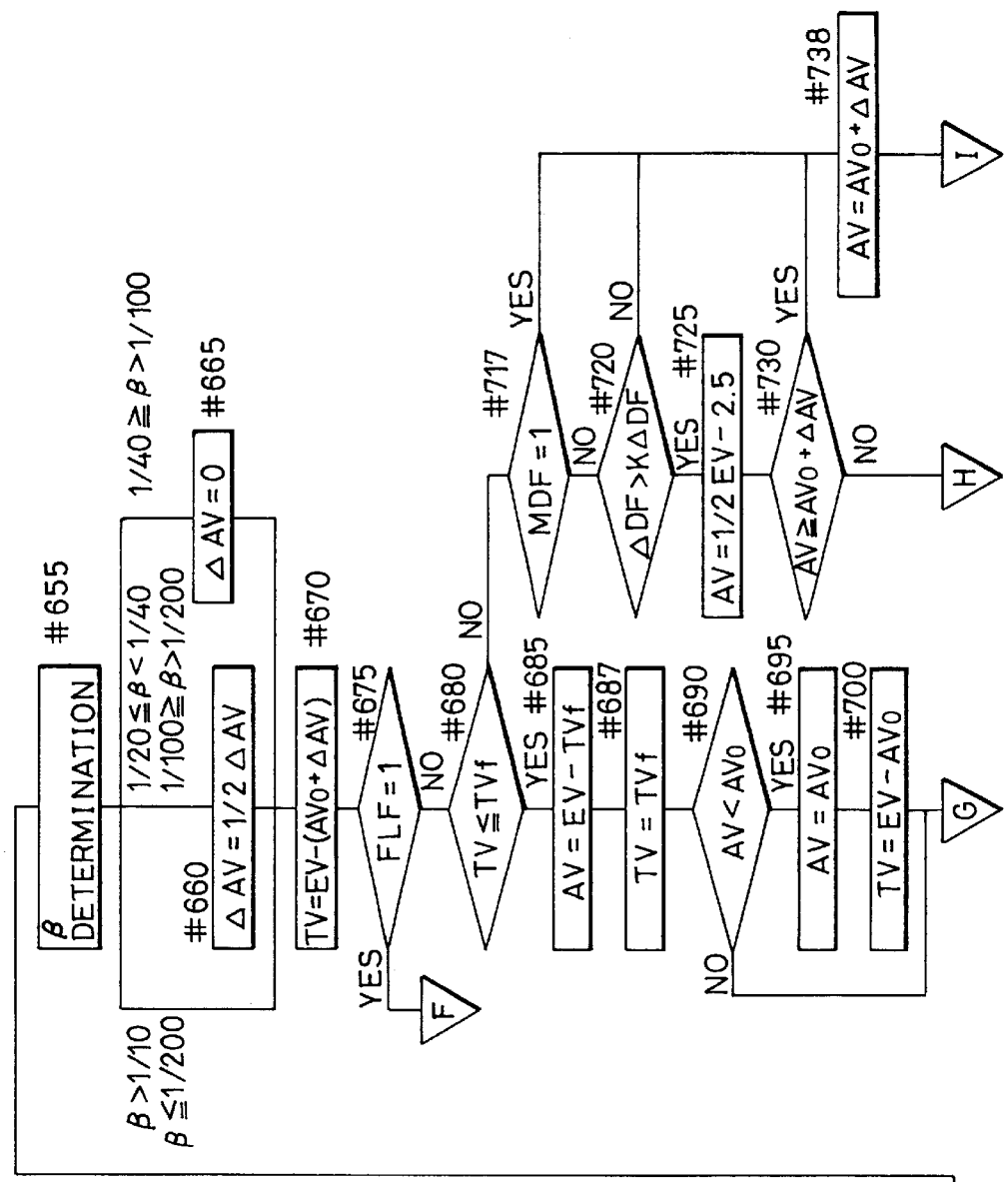
Figure 13B:
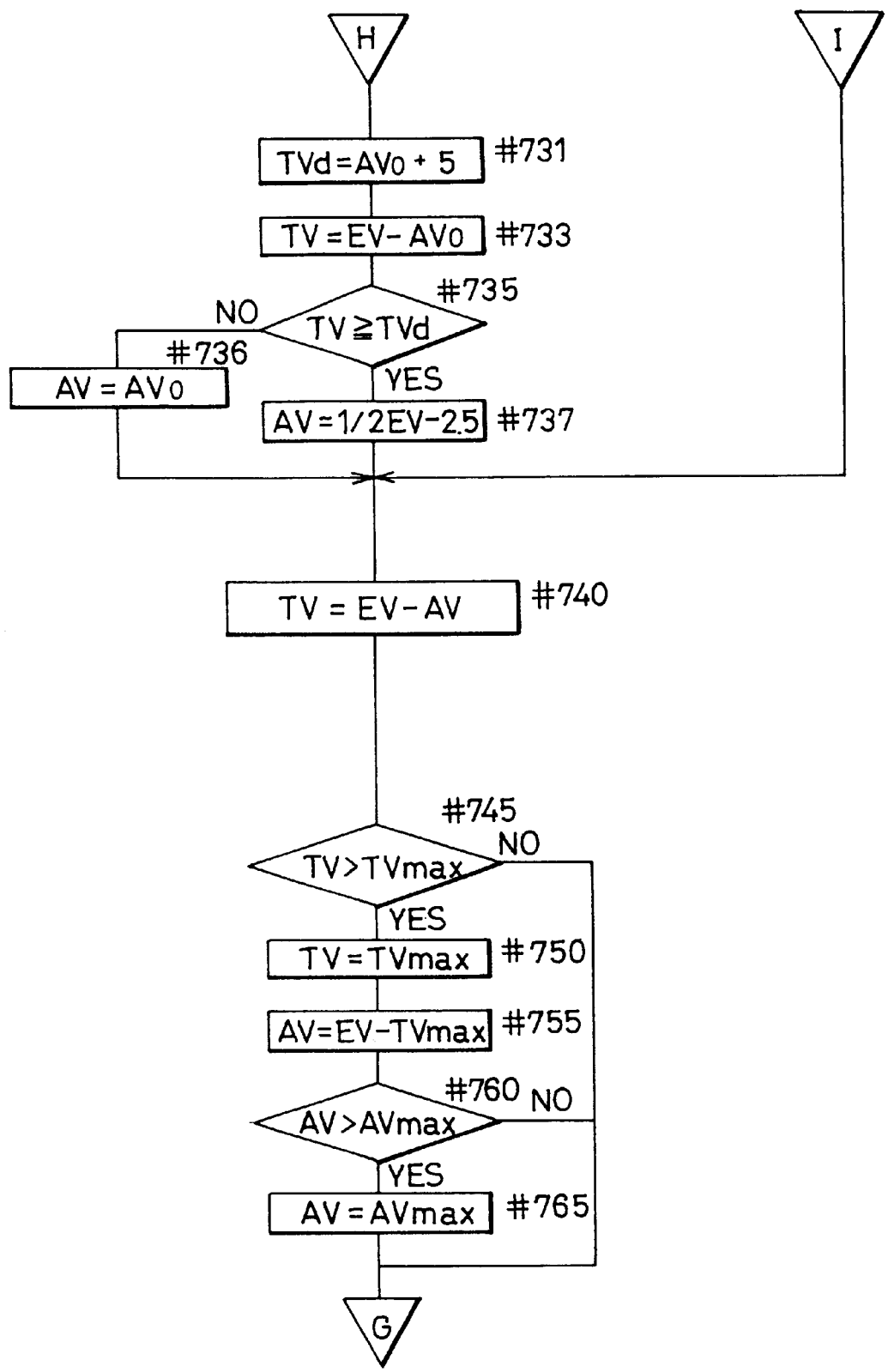

In FIG. 13A, film sensitivity SV is read, magnification β is calculated from focal length f and distance information DV entered from lens, and shutter speed TVf which is very likely to cause camera-shake is found from focal length f (#610 to #620). Subsequently, determination is made as to whether detection of camera-shake is possible or not. If it is possible, the detection OK flag is set. Then, since correction of camera-shake is possible, the above-mentioned shutter speed is set as TVf=TVf−3 so as to reduce a limit shutter speed which does not cause camera-shake. If it is not possible, nothing is done and the program proceeds to step #635 (#625 and #630). It has been known that in order to prevent pictures from being blurred, faster one of a currently determined shutter speed and the limit shutter speed may be desirably used. This limit shutter speed which does not cause camera-shake is reduced through the steps described above. At step #635, determination is made as to whether lens open F value $AV_0$ meets $AV_0 \geq 5$ or not (#365). When lens open F value $AV_0 \geq 5$, aperture variation ΔAV is made to meet ΔAV=2, and when $AV_0<5$, the variation is made to meet ΔAV=3, and then the program proceeds to step #646. Meanwhile, brightness value BV is made to meet BV=$BV_0$+$AV_0$ and exposure value EV is made to meet EV=BV+SV (#646 and #647).

After exposure value EV is found, magnification β is determined (#655). When β>1/10 or β≦1/200, the program proceeds to step #670. When 1/20≦β<1/40 or 1/100 ≧β>1/200, aperture correction amount ΔAV is changed to ΔAV/2 and then the program proceeds to step #670 (#655 to #665). At steps #670, shutter speed TV is found from TV=EV−($AV_0$+ΔAV). When flag FLF indicative of flash photographing has been set at step #675, the program proceeds to step #770. When flag FLF has not been set, the program proceeds to #680 where determination is made as to whether the calculated shutter speed TV is below camera-shake causable shutter speed TVf or not (#680). If TV≦TVf, aperture AV is found by AV=EV−TVf and TV is made equal to TVf (#685 and #687).

Subsequently, determination is made as to whether AV<$AV_0$ stands or not for aperture (#690). When AV<$AV_0$, AV is made equal to $AV_0$, shutter speed TV is set to EV−$AV_0$ (#700), and then the program proceeds to step #705. The calculated TV and AV are employed as control shutter speed $TV_C$ and control aperture value $AV_C$, determination is made on release lock as will be described later, and then the program returns to the main routine (#690 to #715). When AV≧$AV_0$ at step #690, the program immediately proceeds to step #705.

When TV>TVf at step #680, the program proceeds to step #717 where determination is made as to whether flag MDF has been set or not, which is to be set when camera-shake is large in determining a moving object. When it has been set, i.e., when MDF=1, or when variation ΔDF between two defocus amounts is below a predetermined value, it is determined that the object is not moving and then the program proceeds to step #738. When flag MDF has not been set at step #717 and defocus variation ΔDF is larger than the predetermined value K ΔDF, it is determined that the object is moving and then, aperture is found by AV=(1/2)·EV−2.5 (#725). Thus, when the object is moving, the aperture value is subtracted from the predetermined value so as to set aperture to open larger. As a result, the shutter speed is increased. Subsequently, at step #730, determination is made as to whether aperture AV meets AV≧$AV_0$+ΔAV or not. When AV≧$AV_0$+ΔAV, the obtained shutter speed will be lower than the value found by AV=$AV_0$+ΔAV even if the object is in motion. Therefore, the program proceeds to step #738 where AV is made equal to $AV_0$+ΔAV and then, further proceeds to step #740.

On the other hand, when AV<$AV_0$+ΔAV at step #730, the program proceeds to step #731 to increase the shutter speed. At step #731, shutter speed TVd for stopping down aperture from aperture F value $AV_0$ is found by TVd=$AV_0$+5 and shutter speed TV is found by TV=EV=$AV_0$ (#731 and #733). Then, determination is made as to whether the thus obtained shutter speed is larger than $TV_d$ or not (#735). When TV≧$TV_d$, TV is made equal to (1/2)·EV−2.5 (#737). When TV<$TV_d$, AV is made equal to $AV_0$ (#736), and then the program proceeds to step #740.

The aperture value shown in FIGS. 13A to 14B is determined as AV=$AV_0$ when TV<$TV_d$. When TV≧$TV_d$ and AV<AV₀+ΔAV, AV is made equal to (1/2)·EV−2.5. When AV≧AV₀+ΔAV, the aperture value is found by AV=AV₀+ΔAV. Shutter speed TV is found by TV=EV−AV.

At step #740, shutter speed TV is found by TV=EV−AV and determination is made as to whether TV is larger than maximum shutter speed TVmax or not (#745). When TV is not larger than TVmax, the program proceeds to #705. When TV is larger than TVmax, TV is made equal to TVmax and aperture value AV is found again by AV=EV−TVmax. Then, determination is made as to whether aperture value AV is larger than maximum aperture value TVmax or not (#750 to #760). If AV>AVmax, AV is made equal to AVmax and then the program proceeds to step #705. When AV≦AVmax, the program immediately proceeds to step #705.

When flag FLF indicative of flash photographing has been set at step #675, the program proceeds to step 770 where determination is made as to whether shutter speed TV is equal to camera-shake causable shutter speed TVf. If TV≦TVf, determination is made as to whether the above-mentioned TVf is larger than maximum shutter speed TVx for synchronizing with flash emission or not (#770 and #775). If Tvf>Tvx, TV is made equal to Tvx, and if Tvf≦Tvx, TV is made equal to Tvf. Thus, a fast shutter speed which is least likely to cause camera-shake is set and aperture is set to open larger so that flash-light can reach farther or amount of the light becomes small (#780 and #785). Whether it is from step #780 or #785, the program proceeds to step #790 where aperture AV is found by AV=EV−TV (#790). Subsequently, determination is made as to whether the aperture value AV found at step #795 is smaller than open aperture value AV₀ or not. If AV<AV₀, AV is made equal to AV₀ and the program proceeds to step #705. On the other hand, if AV≧AV₀ at step #795, determination is made as to whether AV is larger than maximum aperture value AVmax or not (#805). If AV>AVmax, AV is made equal to AVmax and then the program proceeds to step #705. If AV≦AVmax at step #805, the program immediately proceeds to step #705. If TV>Tvf at step #770, determination is made as to whether the shutter speed TV is larger than synchronizing maximum shutter speed Tvx or not. If TV>TVx, TV is made equal to TVx and then the program proceeds to step #790 (#815 and #820). If TV≦TVx at step #815, the program proceeds to step #705.

In FIGS. 14A and 14B, there are shown diagrams of AE programs where focal length/open F value of length is 35 mm/f4 and 3200 mm/f5.6, respectively. In both diagrams, X-axis denotes values of shutter speed TV, Y-axis denotes aperture values AV, and relationship between them are shown using exposure values as parameter.

Figure 13C:
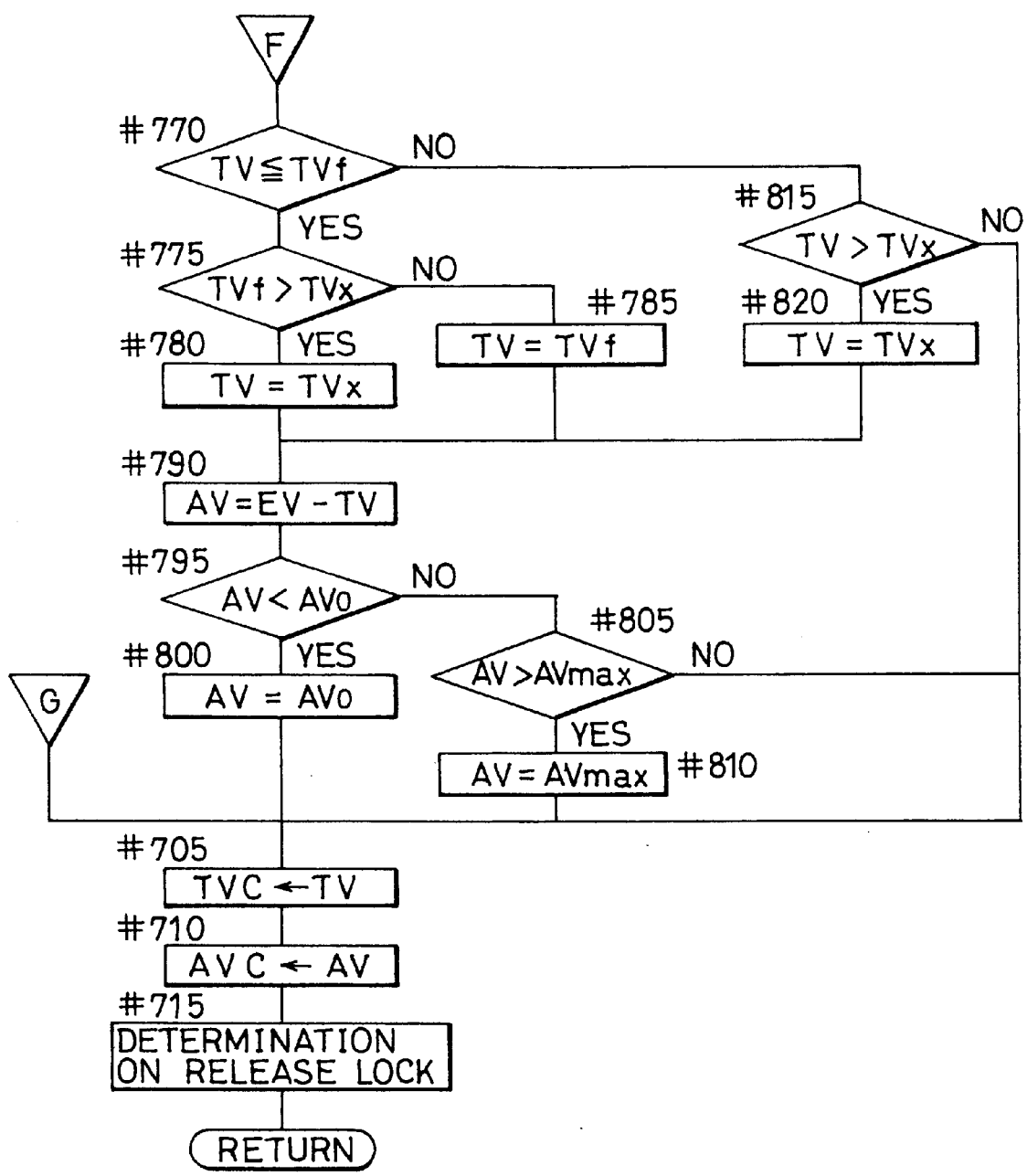
Figure 15:
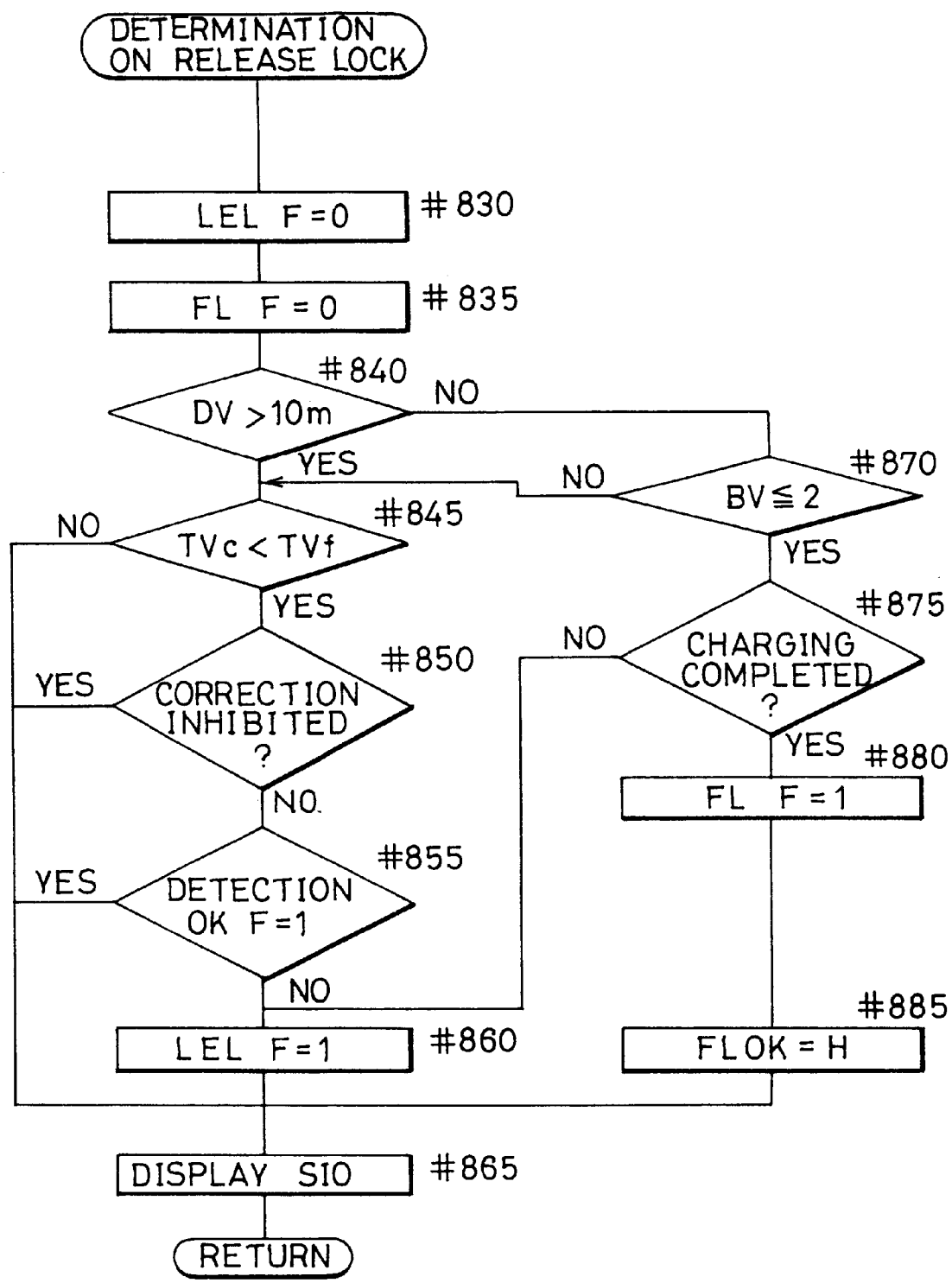
FIG. 15 is a flow chart diagram for explaining operation of a camera according to the present invention.

Next, the subroutine for determining release lock as shown at step #715 in FIG. 13C will be described with reference to FIG. 15. Referring to FIG. 15, first, flag LELF indicative of release lock and flag FLF indicative of flash emission are reset and determination is made as to whether distance DV entered from lens is larger than 10 m or not (#830 to #840). When object distance DV is larger than 10 m, it is determined that no figure is photographed and thus, flash is not emitted. When object distance DV is larger than 10 m and control shutter speed TVc is higher than camera-shake causable speed TVf, or when camera-shake correction is inhibited, or when camera-shake detection is possible (when detection OK flag is representing 1), release lock is not made but data of display as will be described later is output, and then the program returns to the main routine (#845 to #855 and #865).

If at steps #845 to #855, control shutter speed TVc is under camera-shake causable speed TVf and camera-shake detection can not be made even though the correction inhibit mode has not been set, flag LECF for release lock is set (#860) since there is a large possibility of camera-shake taking place, and then the program proceeds to step #865.

When distance DV is not larger than 10 m at step #840, the program proceeds to #870 where determination is made as to whether the expression for object brightness BV, or BV≦2 stands or not. If BV≦2 at step #870, the electronic flash device ST photographing is performed to give contrast to the object. A signal indicative of whether charging of a main condenser for flash has been completed or not is entered from flash device FL. If the charging has been completed, flag FLF indicative of flash emission is set, potential on terminal FLOK is set to the H level to allow flash emission, and then the program proceeds to step #865. On the other hand, when the charging has not been completed at step #875, the program proceeds to step #860 where flag LECF indicative of release lock is set. When BV>2 at step #870, photographing is performed without using flash. Therefore, the program proceeds to step #845 and the flow following the step #845 is executed.

Figure 16A:
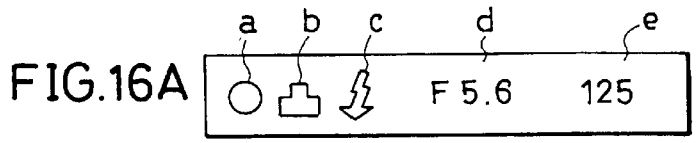
FIGS. 16A and 16B are diagrams showing contents displayed at the display portion and in the finder of a camera body.
Figure 16B:
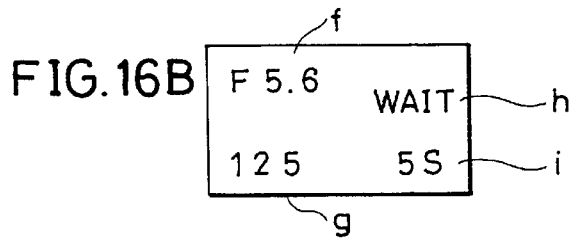

Now, contents displayed in the display SIO subroutine will be described with reference to FIGS. 16A and 16B. FIG. 16A shows contents of display $DISP_2$ (FIG. 2) in finder, and FIG. 16B shows contents of external display $DISP_1$ shown in FIG. 1. In the diagrams, a shows presence or absence of release lock, and when displayed, it indicates that camera is in the released lock state. b is displayed when camera-shake correction is not inhibited, and the same is turned on and off when the camera-shake correction was not successfully made. c indicates that charging is completed for flash photographing. d, e, f and g indicate control shutter speeds and aperture values. h is displayed when the angular velocity sensor is not stable, and i displays a waiting time.

When the above-mentioned AE operation is completed, the program returns to the flow shown in FIG. 9 and determination is made as to whether release switch S2 has been turned on or not (#420). When it has not been turned on, the program proceeds to step #405. When release switch S2 has been turned on at step #420, determination is made as to whether release lock has been set or not (#425). If release lock has been set (LELF=1), the program proceeds to step #445. When release lock has not been set at step #425 (LELF=0), exposure control is performed (#430), film is wound by one frame (#435), and the system waits for brightness measuring switch S1 being turned off (#440). When brightness measuring switch S1 is turned off at step #440, the program proceeds to step #445. Details of the exposure control mentioned at step 430 will be described later. At step #445, determination is made as to whether brightness measuring switch S1 has been turned off or not. If it has been turned on, power holding timer TA is reset to start (#450), and then the program proceeds to step #295. When brightness measuring switch S1 has been turned off at step #445, the program proceeds to step #445 where determination is made as to whether power holding timer TA has reached five seconds or not (#455). If the above-mentioned timer shows less than 5 seconds, the program proceeds to step #295. When the above-mentioned timer has gone beyond five second at step #455, determination is made as to whether the correction inhibit switch has been turned off or not (#460). If it has been turned on, the program proceeds to #125 (see FIG. 3) where control is conducted to stop the operation. If correction is not inhibited at step #460, the program proceeds to step #465 where determination is made as to whether power holding timer TA has reached T3 (1 minute) or not. When the above-mentioned timer has not yet reached T3 at step #465, potential on terminal PW1 is set to the L level so as to turn off power supply to the brightness measuring circuit and the like, and then the system waits until T3 is reached (#465 and #470). When T3 is reached, the program proceeds to step #125 shown in FIG. 3 and control is conducted to stop the operation.

Figure 17A:
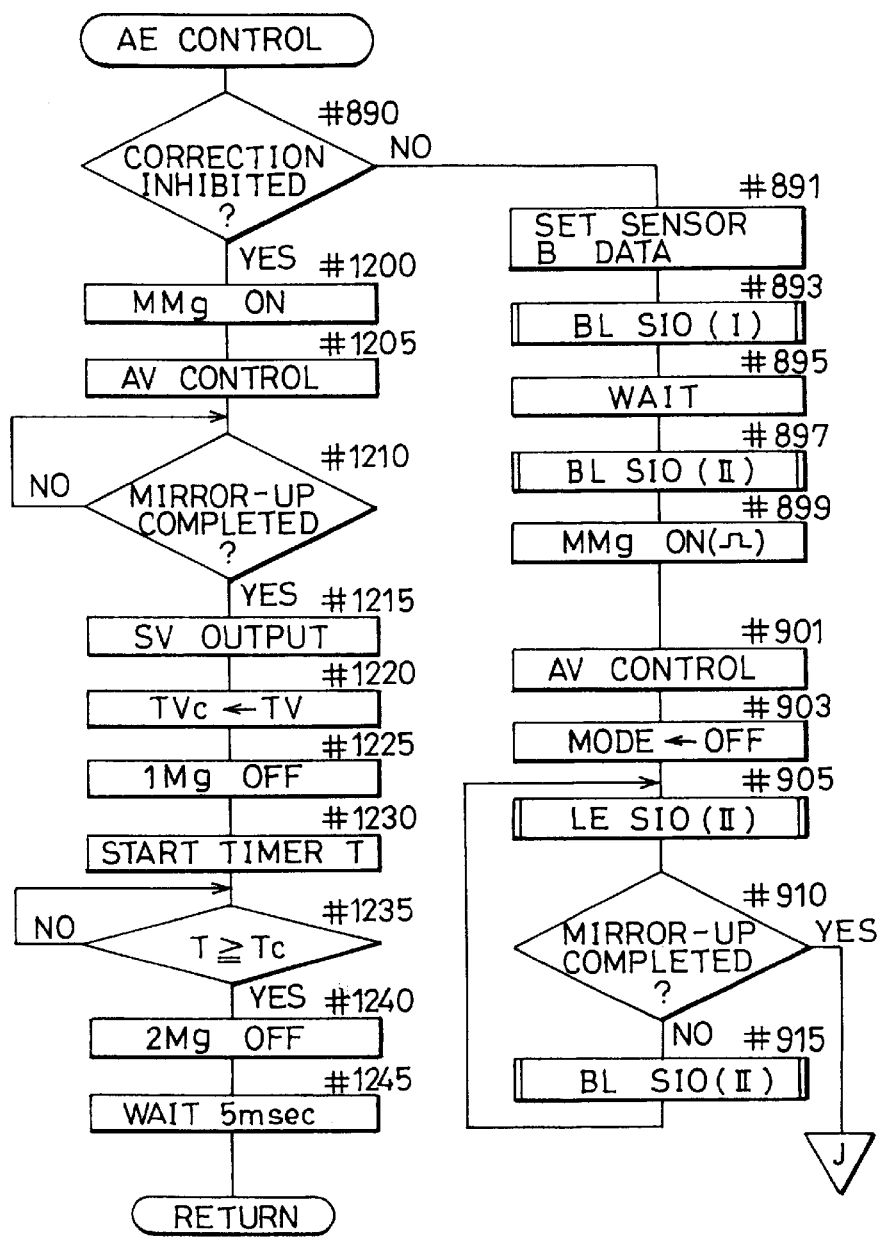

Subsequently, the AE control subroutine shown at step #430 in FIG., 9 will be described with reference to FIG. 17. First, detection is made as to whether the correction inhibit mode has been set or not (#890). If the correction inhibit mode has not been set, the mode B (continuous mode) is selected as sensor mode of camera-shake detector BL, data indicative thereof is output to camera-shake detector BL, and then the system waits for a time (10 msec) required for detector BL to enter data of camera-shake (#891 to #895). Subsequently, to receive the data, the system performs data communication with camera-shake detector BL (#897). Thereafter, to lift up mirror, an unshown magnet for mirror-up is turned on and aperture control is conducted based on control aperture value $AV_c$ (#899 and #901). Then, data of lens control mode is turned off, data communication (II) with lens is made so as to output data such as camera-shake amount, mode and the like to lens, and then determination is made whether or not the lifting-up of mirror has been completed or not (#903 to #915). If the lifting-up of mirror has not been completed, data of camera-shake amount is entered from camera-shake detector BL and then the program proceeds to step #905 where the data of camera-shake amount is output to lens (#915). When the lifting-up of mirror has been completed at step #910 ($S_{MUP}$ is ON), the program proceeds to step #920 where data is entered from camera-shake detector BL (#920). Thereafter, based on the entered data, determination is made as to whether the camera-shake amount is large or not (#925). Then reason why such a program is employed is as follows. The camera-shake amount is increased due to operation of a release button and release control such as aperture control, mirror control and the like. In order to reduce camera-shake amount at the time of exposure, the camera-shake amount at that time is detected. When the camera-shake amount is large, release is inhibited until the amount becomes small. When it is determined at step #925 that camera-shake amount is large, data communication with lens is made when data of the camera-shake amount is output to lens. Thus, the program does not return to #920 (#930 and #935) until the camera-shake amount becomes small. When the camera-shake amount has become small at step #925, the program proceeds to step #940 where release mode is selected for lens, and then data indicative thereof is output to length (#945). Thereafter, film sensitivity data SV is output through a D/A converter as analog data to a brightness adjusting circuit. Real time $T_c$ is found from control shutter speed $TV_c$ (#955), an engagement magnet for preceding shutter curtain is turned on, and then exposure timer T is reset to start (#950 to #960). Then, comparison is made between real time $T_c$ and current time T to determine whether ($T_c-T$) is larger than a predetermined value $K_T$ or not (#970). The time $K_T$ is a little larger those times taken for data communication with camera-shake detector BL and lens, respectively. When $T_c-T$ is smaller than $K_T$, precise control of the exposure time is impossible and thus, the program proceeds to step #975. At step #975, determination is made as to whether exposure timer T has reached real time $T_c$ or not. When $T \neq T_c$, the program proceeds to #970. When $T=T_c$, the program proceeds to step #977. If ($T_c-T$)>$K_T$ at step #970, data of camera-shake amount is entered from camera-shake detector BL and output as lens data, and then the program proceeds to step #975 (#971 and #973). If $T=T_c$ at step #975, the program proceeds to step #977 where an engagement magnet for trailing shutter curtain is turned off (#977). Data of camera-shake amount is entered from camera-shake detector BL and output to lens (#979 to #981). At this time, data communication with lens is generally allowed only one time, though it depends on travelling speed of the trailing shutter curtain and speed of the data communication. Thus, even after the travelling of the trailing shutter curtain, camera-shake correction is restricted to as small as possible until exposure is completed. The system waits for the time (5 msec) taken for the traveling of the trailing shutter curtain to be completed. Thereafter, data for turning off the sensor of camera-shake detector BL is set and output to camera-shake detector BL, and then data is entered from lens (#983 to #989). Based on the entered data, determination is made as to whether or not data of camera-shake limit exists or not which indicates whether camera-shake correction of lens has been made or not (or indicates that the correction lens has reached the correction limit) (#993). When the data of camera-shake limit exists at step #991 (when the data has been set), camera-shake data for display is set (#993) so as to turn on and off the designation b shown in FIG. 16A. When the data of camera-shake limit has not been set, the above-mentioned camera-shake data for display is reset (#995) and then the program proceeds to step #997. Thereafter, display data including the data above is output to the display control circuit and the program returns to the main routine (#997).

When the correction inhibit mode has been set at step #890, no control associated with camera-shake correction is conducted but the other control associated with, for example, data communications with camera-shake detector and lens and exposure is done. Microcomputer μC controls exposure from step #1200 to #1245. However, the control adopts only necessary steps out of the above-described steps #891 to #977 and has no specific relation with the present invention. Therefore, description thereof is omitted and only its diagram is given.

Referring to FIGS. 18 to 22, a circuit block diagram of camera-shake detector BL, specific examples of the camera-shake detector, and a flow chart of the microcomputer controlling the detector will be described.

Figure 18:
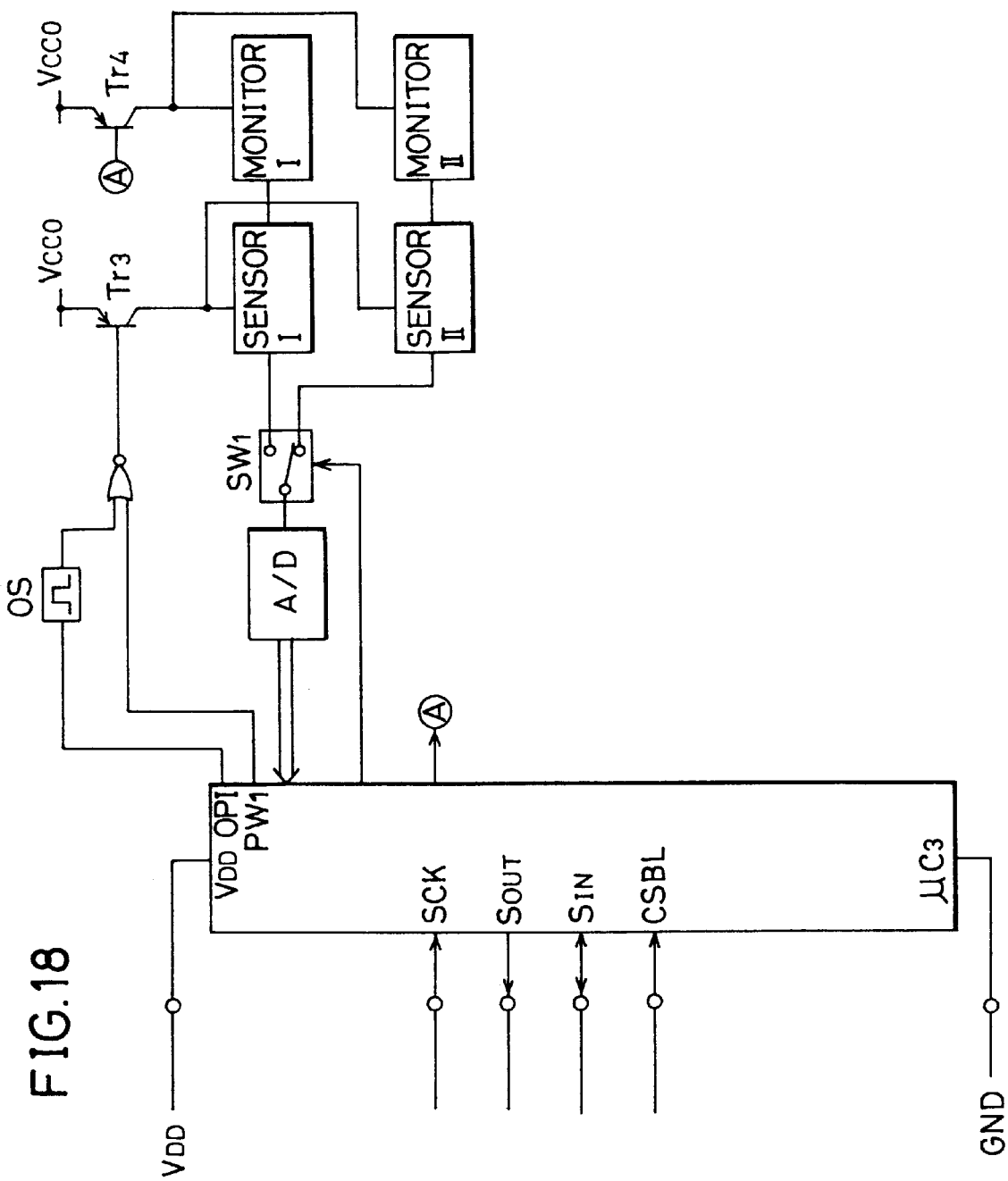
FIGS. 18 to 23 are circuit block diagrams of a camera-shake detector applicable to the present invention and flow chart diagrams of a microcomputer controlling the circuit.

Referring to FIG. 18, camera-shake detector BL comprises, as shown in the circuit block diagram, microcomputer μC3 which performs operation of camera-shake amount and data communication with microcomputer μC having control over the entire circuit block and the whole camera. Sensors I and II are sensor portions for detecting outputs of angular velocity obtained from monitors I and II in monitor portions each comprising an angular velocity sensor. Switch SW1 is a selecting switch for selecting output of either one of the sensors I and II to be applied to an A/D converter. Transistors Tr3 and Tr4 supply power to monitors I and II and sensors I and II. One shot circuit OS continues to output H level for the period after the power supply to the motors is started until their output is stabilized.

Figure 19:
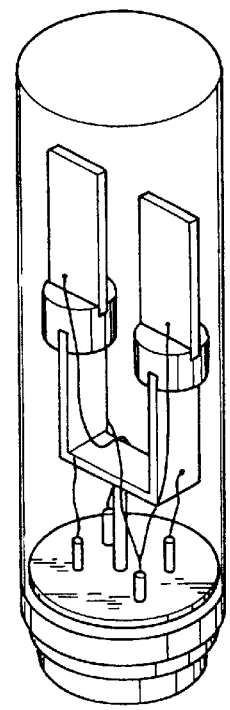
Figure 20:
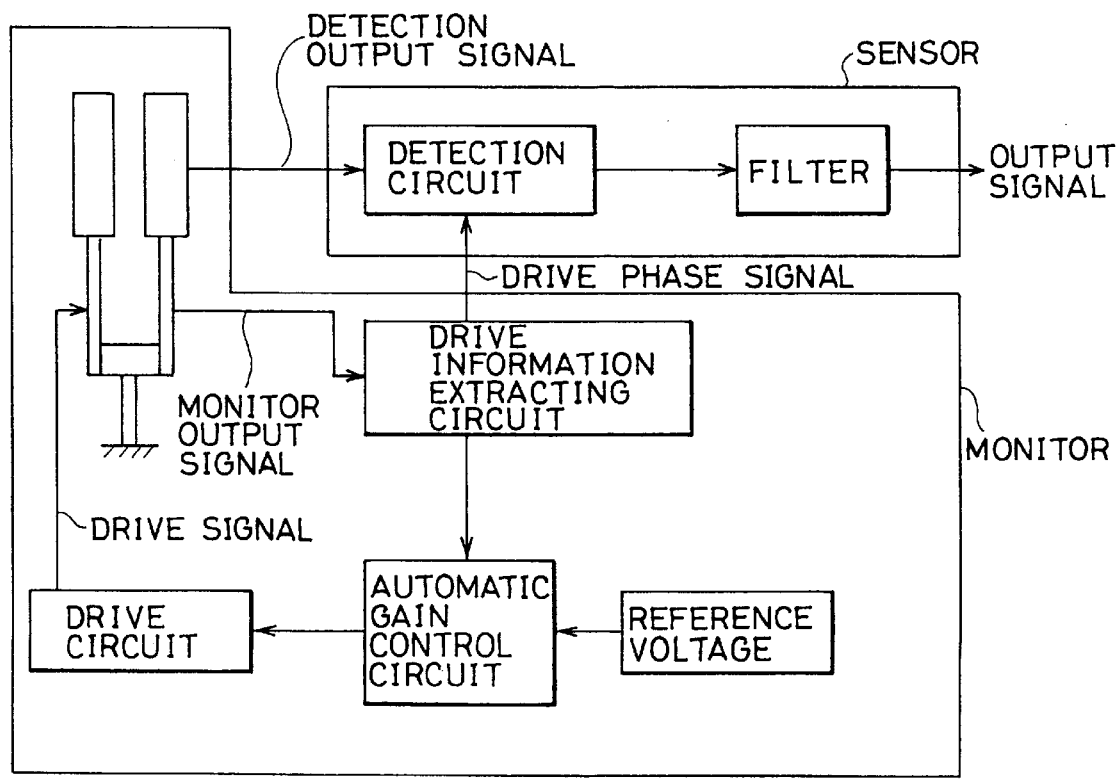
Figure 21:
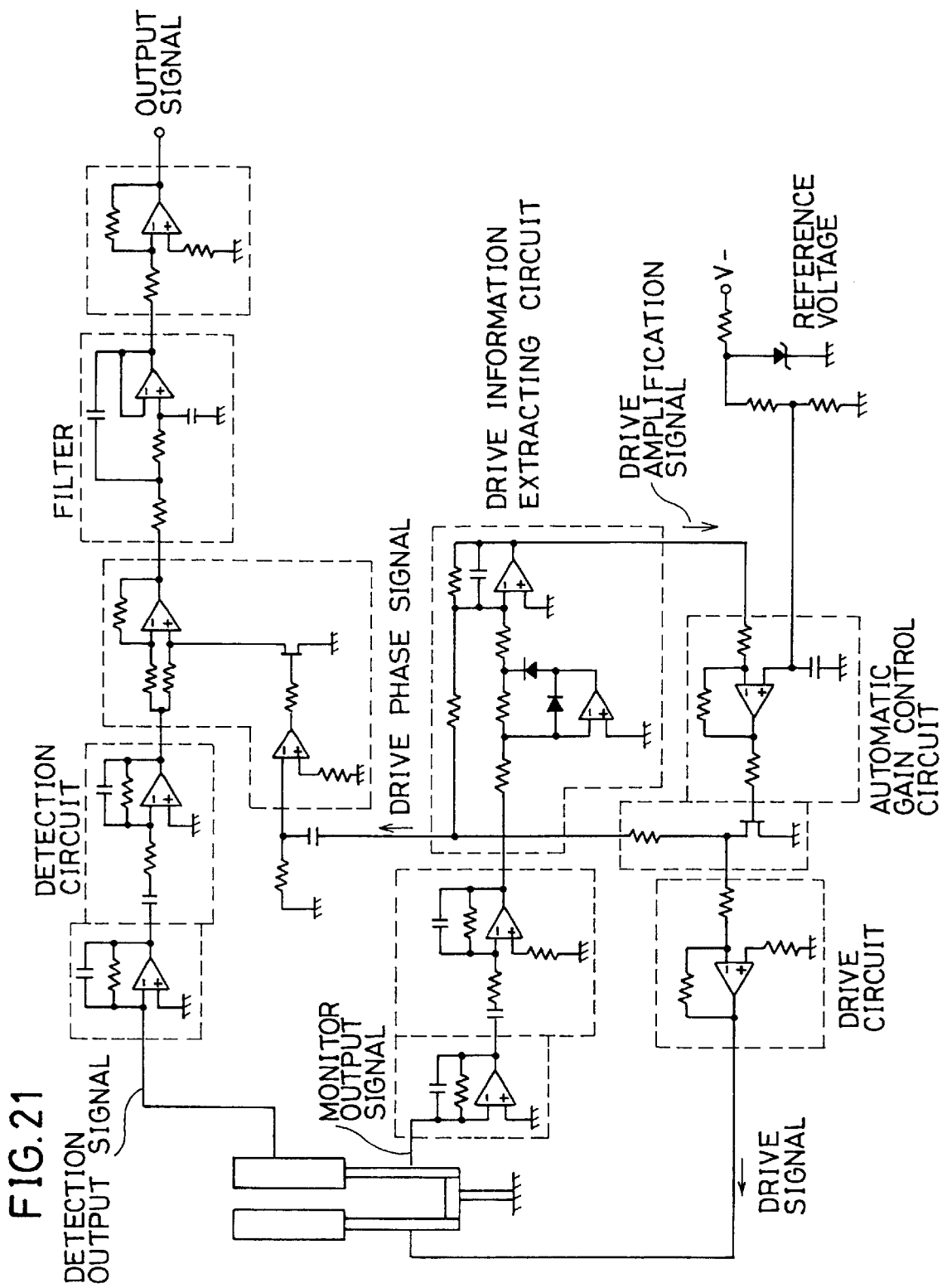

FIG. 19 is a perspective view showing a tuning fork-shaped angular velocity sensor used in the present invention. FIG. 20 is a block diagram showing a sensor portion and a monitor portion of the angular velocity sensor. FIG. 21 is a detailed circuit diagram of FIG. 20. Meanwhile, FIGS. 19 to 21 are disclosed in U.S. Pat. No. 4,671,112. Description on the structure and circuit diagrams of the angular velocity sensor shown in FIGS. 19 to 21 is omitted, since it has no direct relation with contents of the present invention.

Figure 22:
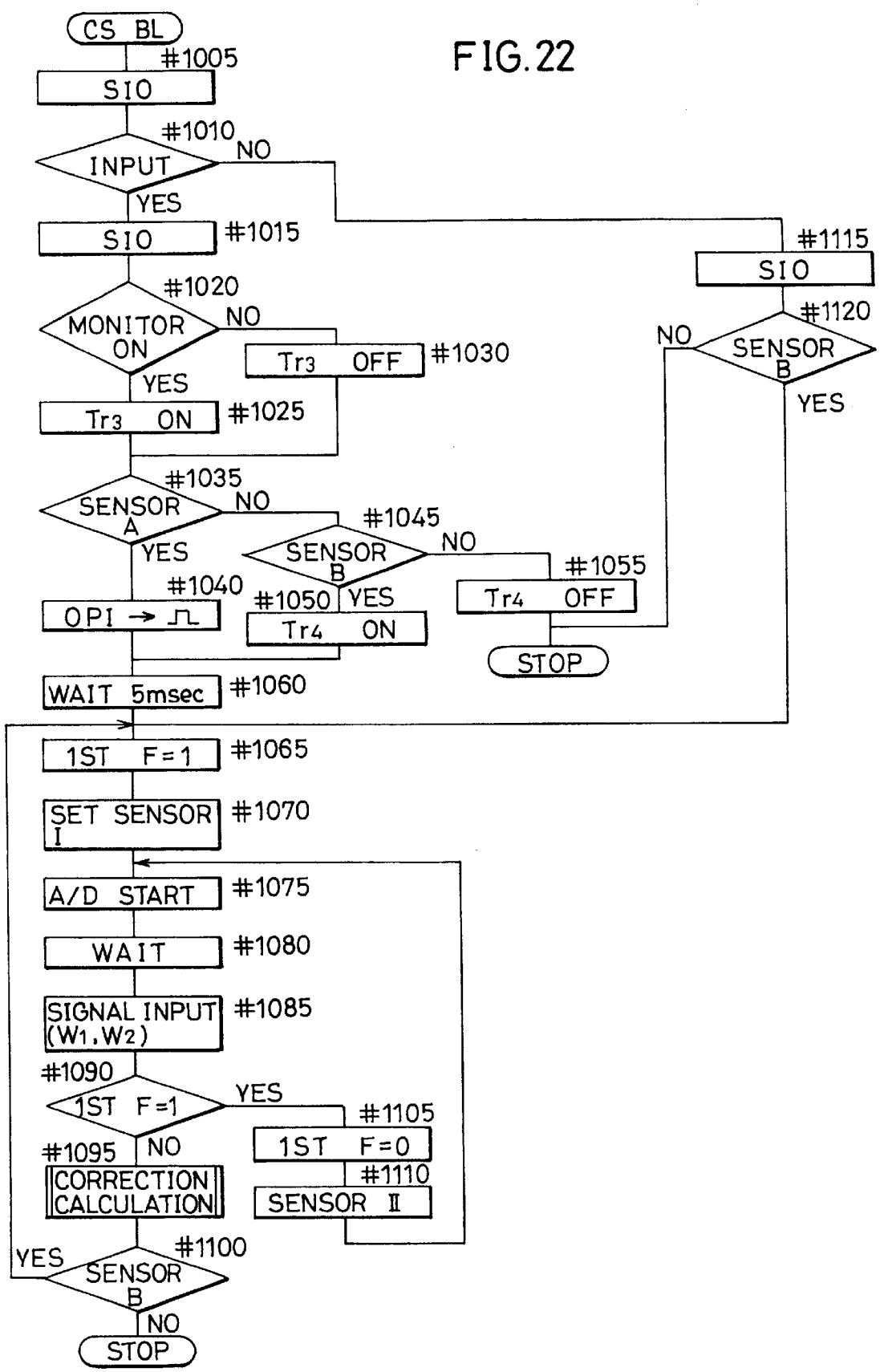

FIG. 22 is a flow chart diagram showing operation of microcomputer μC3 which controls sequence of camera-shake detector BL and calculates detection of camera-shake amount. When voltage on terminal CSBL indicating data communication is set to the L level, the flow of CSBL shown in FIG. 22 is executed as an interruption. First, data communication is made one and from the obtained data, it is determined whether input mode has been set or not (#1005 and #1010). When input mode has not been set, data communication is made to output data and determination is made as to whether the continuous mode B has been selected as sensor mode or not (#1120). If the B mode has not been selected as sensor mode, it is determined that continuous detection of camera-shake amount is not made and therefore, detection is immediately stopped. If the B mode has been selected as sensor mode, the program proceeds to step #1065 to detect camera-shake (#1115 and #1120). The data output at this stage is those indicative of camera-shake correction amount ($\Delta X_{BL}$ and $\Delta I_{BL}$) and those indicative of magnitude of the camera-shake.

When it is determined at step #1010 that input mode has been set, serial communication is made to input data. The input data at this time includes those indicative of ON/OFF of the angular velocity monitors, A, B and OFF of sensor mode, focal length f and object distance DV. Subsequently, when it is determined based on the input data, that the monitors are ON, transistor Tr3 is turned on. When the monitors are OFF, transistor Tr3 is turned off, and then the program proceeds to step #1035 (#1020 to #1030). After step #1035, determination is made as to sensor mode. When the A mode has been selected as sensor mode, terminal OPI is set to the H level for a certain time. When the B mode has been selected as sensor mode, potential on terminal PW1 is raised to the H level to turn on transistor Tr2, and then the program proceeds to step #1060 (#1035 to #1050). If transistor Tr2 is OFF at step #1055, potential on terminal PW1 is set to the L level and then the program stops (#1055). At step #1060, the system waits for the time taken to stabilize the sensors and then, the program proceeds to #1065. At step #1065, flag 1STF indicative of first time of data communication is set and a signal for setting switch SW1 to the side of sensor I is output (#1070). Thereafter, A/D conversion is started and the system waits for the time taken for the A/D conversion, and then a signal is entered (#1075 to #1085). Subsequently, determination is made at step #1090 as to whether flag 1STF indicative of the first time has been set or not. When it has been set, the flag is reset, the switch is set to the side of sensor II and then, the program proceeds to step #1075 where data is entered (#1105 and #1110). When flag 1 STF has not been set at step #1090, correction operation is made from the entered sensor data and determination is made as to whether the B mode has been selected as sensor mode or not. If the B mode has been selected, the program proceeds to step #1065 since continuous detection of camera-shake is required. On the other hand, if the B mode has not been selected, the program stops (#1095 and #1100).

Meanwhile, at steps #1065 to #1110, data writing is performed twice using the flag indicative of the first time. This is because the data to be written in includes those of the X direction and those of the Y direction. Thus, this flag allows data writing to be performed twice in one flow chart.

Subsequently, the method of calculating camera-shake amount as mentioned at step #1095 in FIG. 22 will be described. Generally, when a taking lens is inclined by $\Delta\theta$, movement $\Delta Y$ of object on a surface of film is given as follows.

$$\Delta Y = f(1-\beta) \cdot \tan\theta,$$

where f is focal length of the taking lens and $\beta$ is magnification.

Now, if $\Delta\theta$ is small, an approximate value can be obtained by the following expression.

$$\Delta Y \approx f(1-\beta) \cdot \Delta\theta$$

Subsequently, details of the calculation of correction amount will be described below. It is assumed now that angular velocity outputs $w_1$ and $w_2$ are obtained from the two angular velocity sensors at detection timings $\Delta t$. Thereafter, magnification $\beta$ for the used object is found from AF information of the camera body and focal length information fi of the interchangeable lens. Camera-shake amounts $\Delta X$ and $\Delta Y$ of the object will be found from focal length information fi, magnification $\beta$, angular velocity outputs $w_1$ and $w_2$ and $\Delta t$ by microcomputer $\mu C$ in the camera body, based on the following expressions.

$$\Delta X \approx fi \cdot (1-\beta) \cdot w_1 \cdot \Delta t$$

$$\Delta Y \approx fi \cdot (1-\beta) \cdot w_2 \cdot \Delta t$$

As the magnification increases, a factor of parallel shake may become significant or calculation of approximate values ($\Delta Y = f \cdot \tan\theta$) may not stand.

Therefore, in order to reduce the camera-shake amount found in the case of a large magnification, the term of $(1-\beta)$ is added.

Another embodiment may be adopted where correction is not made when magnification is large, i.e.:

if $\beta < 1/15$, $\Delta Y = f \cdot \tan\theta$ if $\beta \geq 1/15$, $\Delta Y = 0$.

Figure 23:
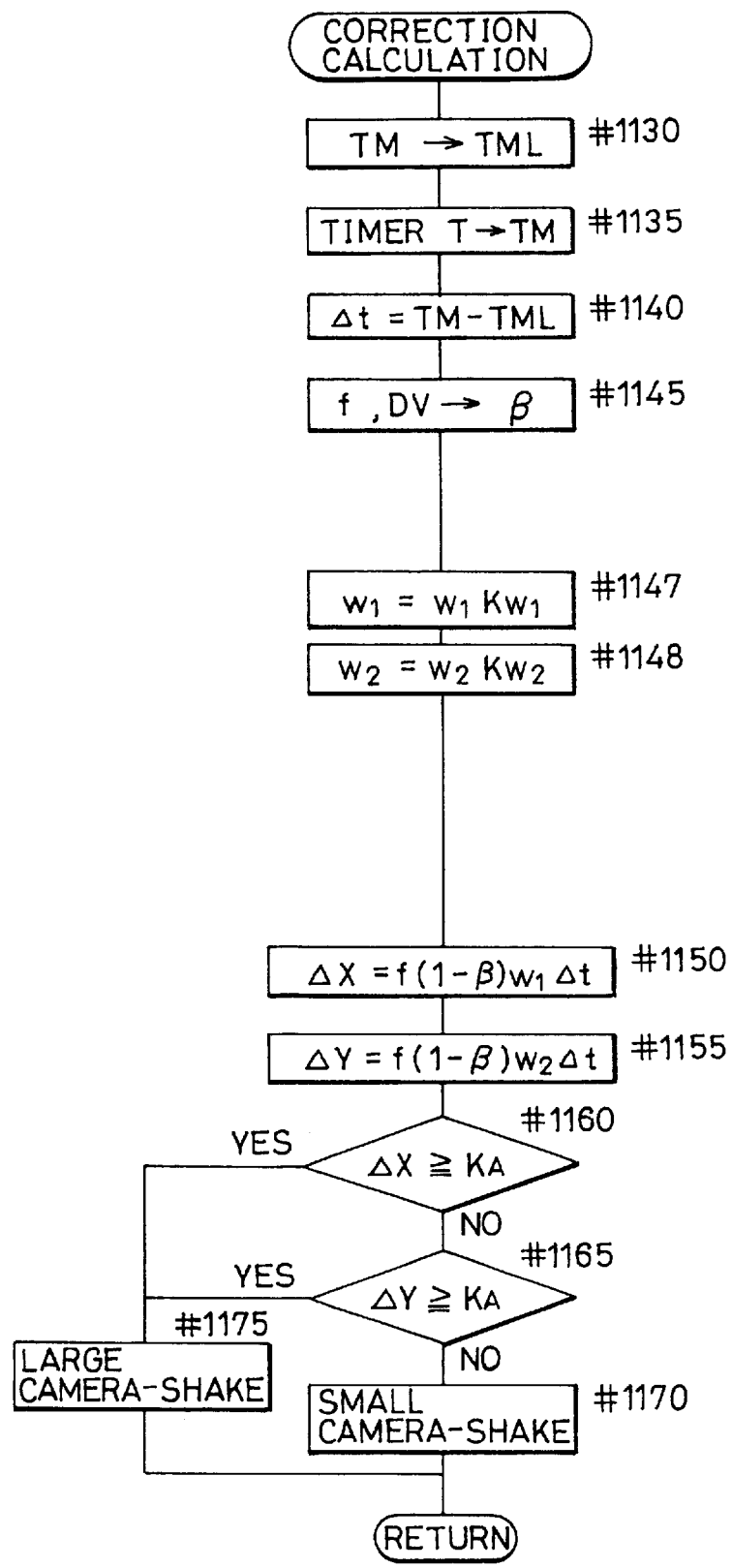

In FIG. 23, there is shown a flow chart diagram of the correction operation shown at step #1095 in FIG. 22. In FIG. 23, the above-mentioned $\Delta t$ is found at steps #1130 to #1145. $\Delta$At steps #1145 to #1155, camera-shake amounts in the X and Y directions are found in the manner as described above. Meanwhile, at steps #1147 and #1148, the outputs $w_1$ and $w_2$ from the respective sensors are multiplied by correction coefficients $Kw_1$ and $Kw_2$ so as to correct errors caused by deviation of the respective angular velocity sensors. Further, at steps #1160 and #1165, determination is made as to whether the above-mentioned respective correction amounts $\Delta X$ and $\Delta Y$ are no less than a predetermined value KA or not. If either is no less than KA, it is determined that the camera-shake amount is large. If both of them are below KA, it is determined that the camera-shake amount is small. Then, data is set and the program returns to the main routine.

Figure 24:
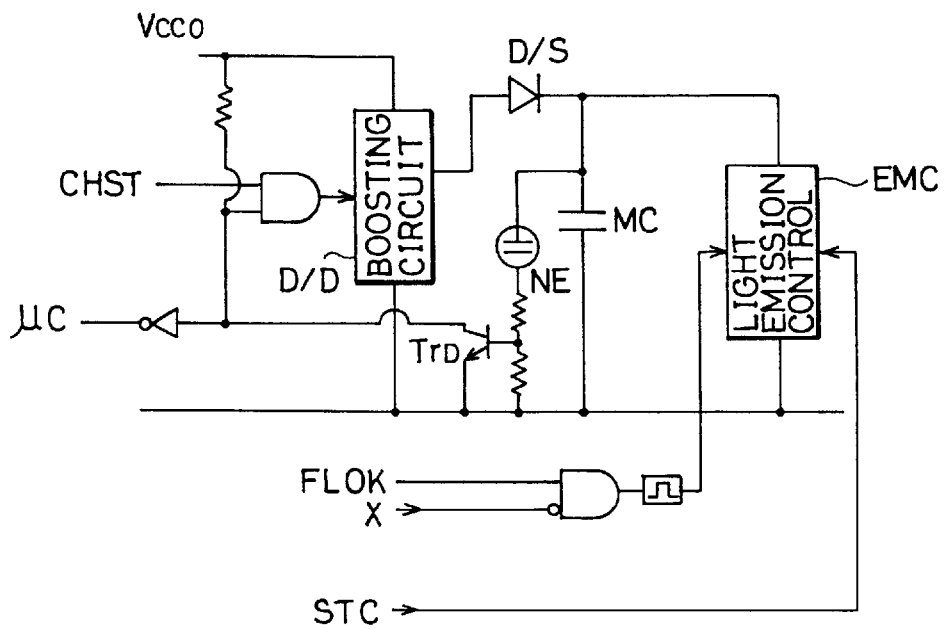
FIG. 24 is a circuit diagram showing a the electronic flash device ST circuit.

Now, referring to FIG. 24, a the electronic flash device ST circuit will be described. Booster circuit D/D boosts a low voltage (battery voltage) to a high voltage and stores energy in emission energy storing condenser MC through rectifying device D/S. Emission control circuit EMC starts emission of flash in response to an AND signal composed of a signal output when flash photographing is performed (which raises potential on the above-mentioned FLOK terminal to the H level) and an X signal put in the ON state when a travel of preceding shutter curtain is completed. The flash emission is stopped in response to an emission stop signal STC.

In the above-described booster circuit D/D, boosting is done when potential of boosting control signal CHST from microcomputer $\mu C$ is at the H level and a signal indicating that charging is not completed (or $Tr_D$ is OFF) is present.

The detection of completed charging is made by connecting a series connection of a neon tube and a ladder resistance to condenser MC in parallel and connecting a transistor $Tr_D$ to the rudder resistance so as to allow the transistor $Tr_D$ to be turned on when the condenser reaches a predetermined voltage.

Figure 25:
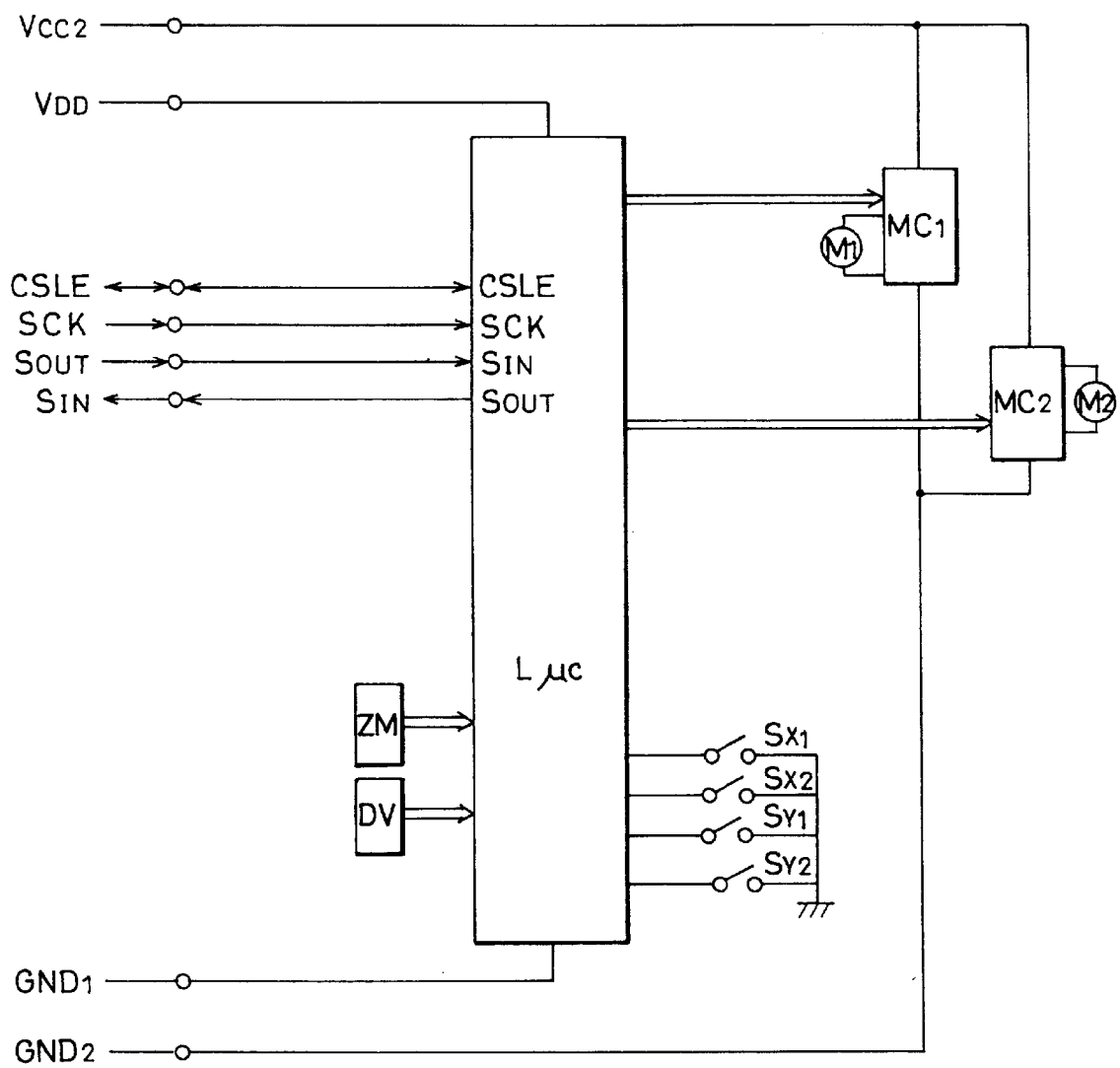
FIG. 25 is a circuit diagram showing circuit structure of lens.

The circuit structure of lens and its connection relationship with camera will be described with reference to FIG. 25. FIG. 25 will be described in connection with the circuit of lens (zoom lens). Lens microcomputer L$\mu$C performs data communication with camera and controls driving of motor control circuits MC1 and MC2 for camera-shake correction. Zoom encoder ZM detects focal length of zoom lens. Distance encoder DV indicates distance. Power is supplied through power supply line Vcc$_2$ to motor control circuits MC1 and MC2 and the two motors. For the other circuits, power is supplied through another power supply line $V_{DD}$. Earth line GND2 is connected to the two motors of motor control circuits MC1 and MC2 having their respective pulse motors. For the other circuits, earth line GND1 is provided.

Subsequently, switches connected to microcomputer L$\mu$C will be described. Microcomputer L$\mu$C on the side of lens has right and left correction limit switches $S_{X1}$ and $S_{X2}$ for the X direction and upper and lower correction limit switches $S_{Y1}$ and $S_{Y2}$ for the Y direction connected thereto, which are turned on when a lens driving portion reaches the correction limits in the respective directions. Terminal CSLE is an input terminal. In response to an input signal from camera, lens microcomputer L$\mu$C executes interruption routine CSLE as will be described later. Input terminals SCK and SIN are for receiving clock signals for data transfer. Terminal SOUT is for outputting lens data.

Figure 26:
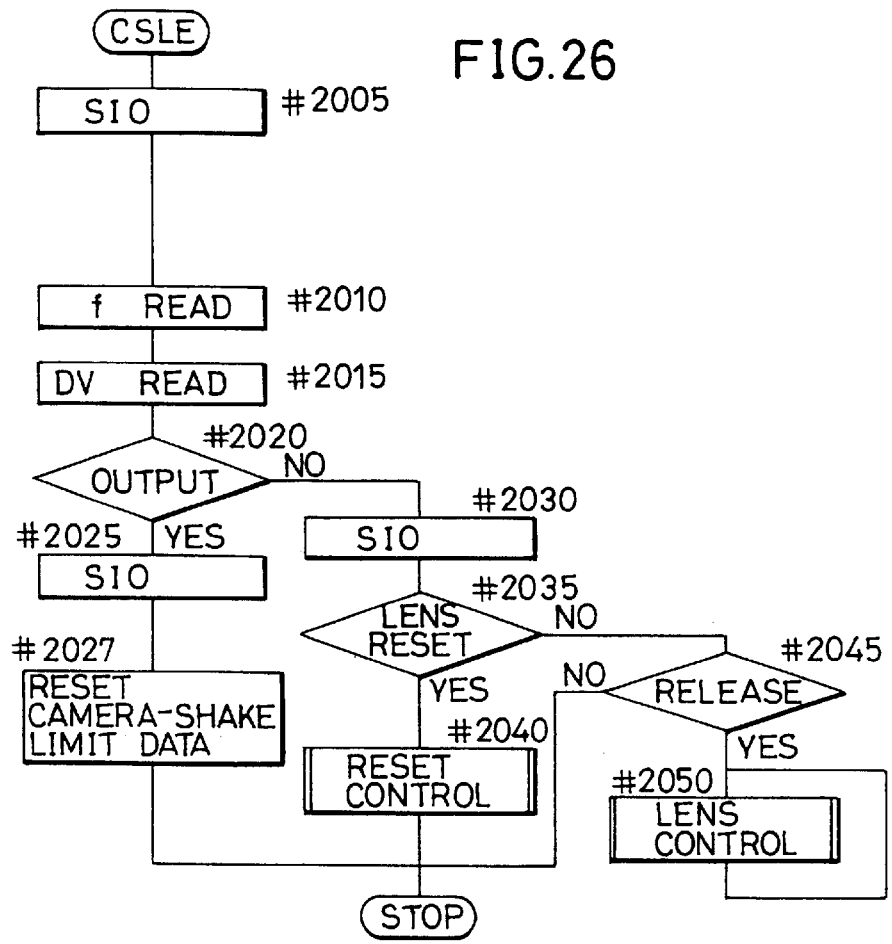
FIGS. 26 and 27 are flow charts diagrams for explaining operation of a microcomputer on the side of lens.

When an interruption signal of CSLE is entered from microcomputer L$\mu$C in the camera body to lens, the interruption routine shown in FIG. 26 is executed. Data of 1-byte is entered from the camera body and then, focal length f and object distance DV are read out (#2005 to #2015).

Now, the data communication will be described. The data communication is divided into lens communication I where lens data is output to camera body and lens communication II where data is output from camera body to lens. From the above-mentioned input data, determination is made as to whether communication I or II is to be made (#2020). If it is determined that output mode I has been set for lens communication, data communication SIO is made to output the predetermined data as described in connection with the respective output data, data of camera-shake limit is reset and then the microcomputer stops its operation (#2025 and #2027). In the input mode (when NO at #2020), camera-shake amounts $\Delta X$ and $\Delta Y$ in the X and Y directions and a mode signal are entered from the camera body (#2030). In response to the mode signal, if lens is to be reset, setting control is performed and then the microcomputer stops its operation (#2035 and #2040). If release mode has been set, lens control is performed until an interruption is executed. Further if neither mode has been set, the microcomputer does not perform any further operation (#2030 to #2050).

Figure 27:
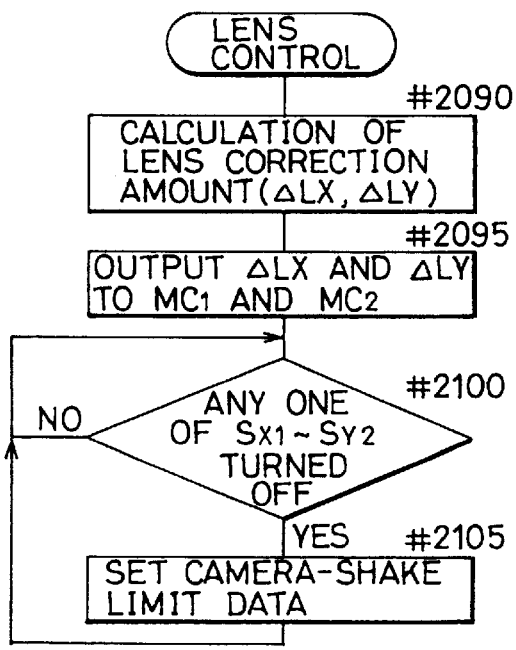

Referring to FIG. 27, the subroutine of lens control shown at step #2050 in FIG. 26 will be described. With reference to FIG. 27, lens correction amount is calculated (#2090), details of which will be described below. In the interchangeable lens, ratio between movement amount of camera-shake correction lens (in a direction vertical to optical axis) $\Delta$LH and movement amount of object (in a direction vertical to optical axis) $\Delta$YL, or LH=$\Delta$LH/$\Delta$YL is stored in a ROM. When a lens having variable focal length such as zoom lens is employed, the ratio LH is stored as information depending on the focal length. Further, for some interchangeable lenses, it is stored as information depending on focusing. Therefore, in an interchangeable lens, ratio LH is read out from information of focal length and distance information DV (amount of forward movement of a focus adjusting lens from infinity photographing position) and converted into movement amounts $\Delta$LX and $\Delta$LY of the correction lens.

$$\Delta LX = LH(f, DV) \times \Delta X$$

$$\Delta LY = LH(f, DV) \times \Delta Y$$

Ratio LH is divided into four cases as follows, depending on the type of an employed interchangeable lens.

(1) An interchangeable lens having only a single specific ratio LH (2) A lens having a ratio LH variable corresponding to focusing (distance):

In this case, when camera body obtains forward movement amount of the lens, data is entered from the camera.

(3) A lens having a ratio LH variable corresponding to zooming (4) A lens having a ratio LH variable corresponding to both focusing and zooming Camera-shake amount of the next time will be estimated using those correction amounts $\Delta$LX and $\Delta$LY. Methods of the estimation will be as follows.

(i) Linear prediction control $$\Delta LX_1 = LH(f, DV) \times \Delta X_{-2}$$

$$\Delta LX_2 = LH(f, DV) \times \{\Delta X_{-1} + (\Delta X_{-1} - \Delta X_{-2})\}$$

$$\Delta LX_3 = LH(f, DV) \times \{\Delta X_1 + (\Delta X_1 - \Delta X_{-1})\}$$

(ii) Multiply ratio between camera-shake amounts of the preceding and present times $(\Delta Xi)/(\Delta Xi_{-1})$ by a constant r and use the result as a weighing factor for the camera-shake amount of the present time taken into consideration of the linear prediction.

$$\Delta LX_1 = LH(f, DV) \times \Delta X_{-2} \circledR \Delta X_{-2}/\Delta X_{-3})$$

$$\Delta LX_2 = LH(f, DV) \times \{\Delta X_{-1} \circledR \Delta X_{-1}/\Delta X_{-2}) + \Delta X_{-1} - \Delta X - 2\}$$

Since the same methods are available also in the Y direction, description thereof is not repeated.

Figure 28:
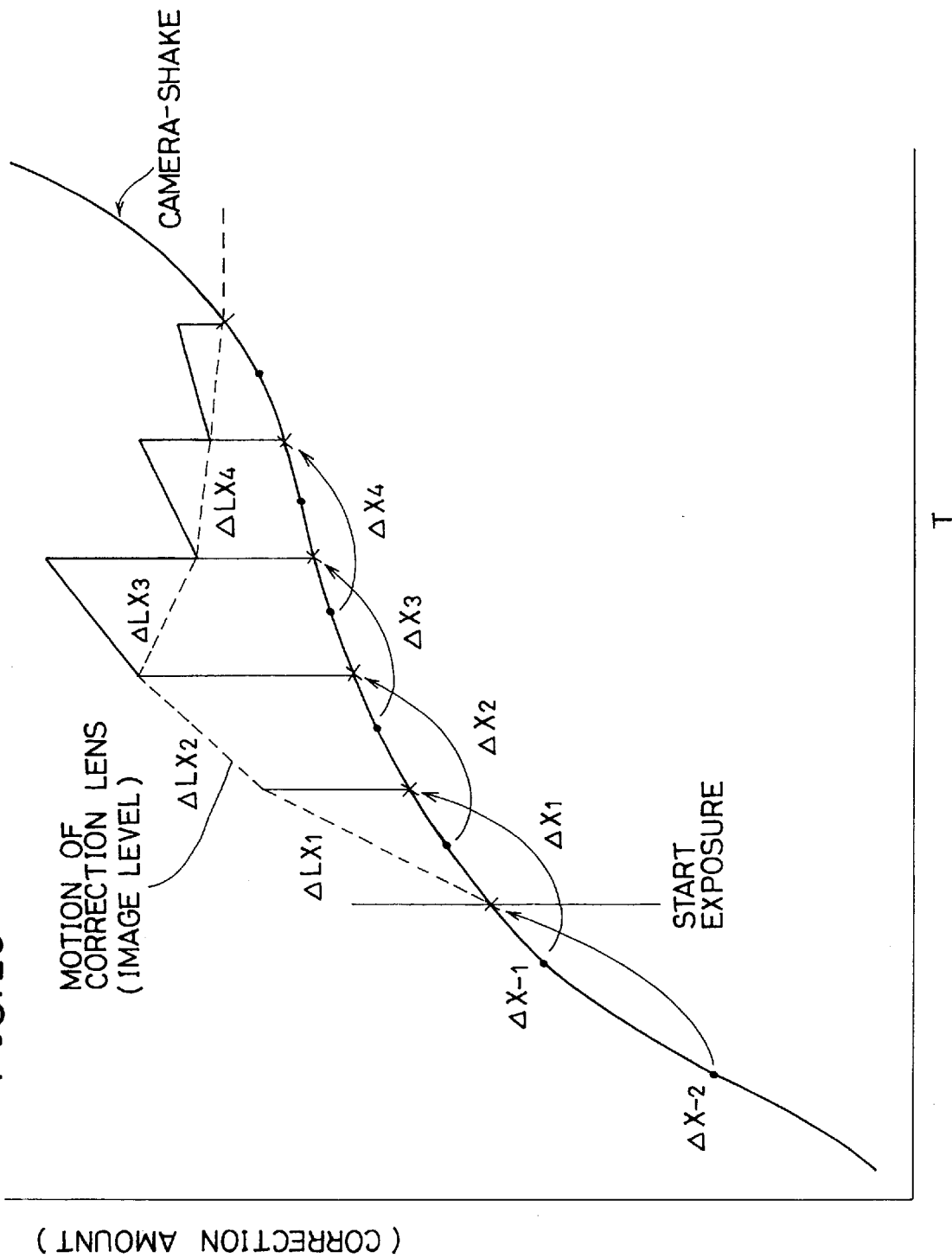
FIG. 28 is a diagram showing results of a simulated correction of camera-shake.

Meanwhile, the results of a simulated linear predict control performed as described in (i) above are shown in FIG. 28.

Turning back to FIG. 27, the thus obtained correction amounts $\Delta$LX and $\Delta$LY are output to the pulse motor control circuit. This allow correction to be made and determination is made as to whether any of correction limit switches $Sx_1$ to $Sy_2$ has been turned off. If any of the switches has been turned off, data of camera-shake limit is set to repeat the detection of turning-off of the switches. If no switch has not been turned off, only the detection of turned-off switches is repeated. This routine continues until interruption CSLE is executed again.

Figure 29:
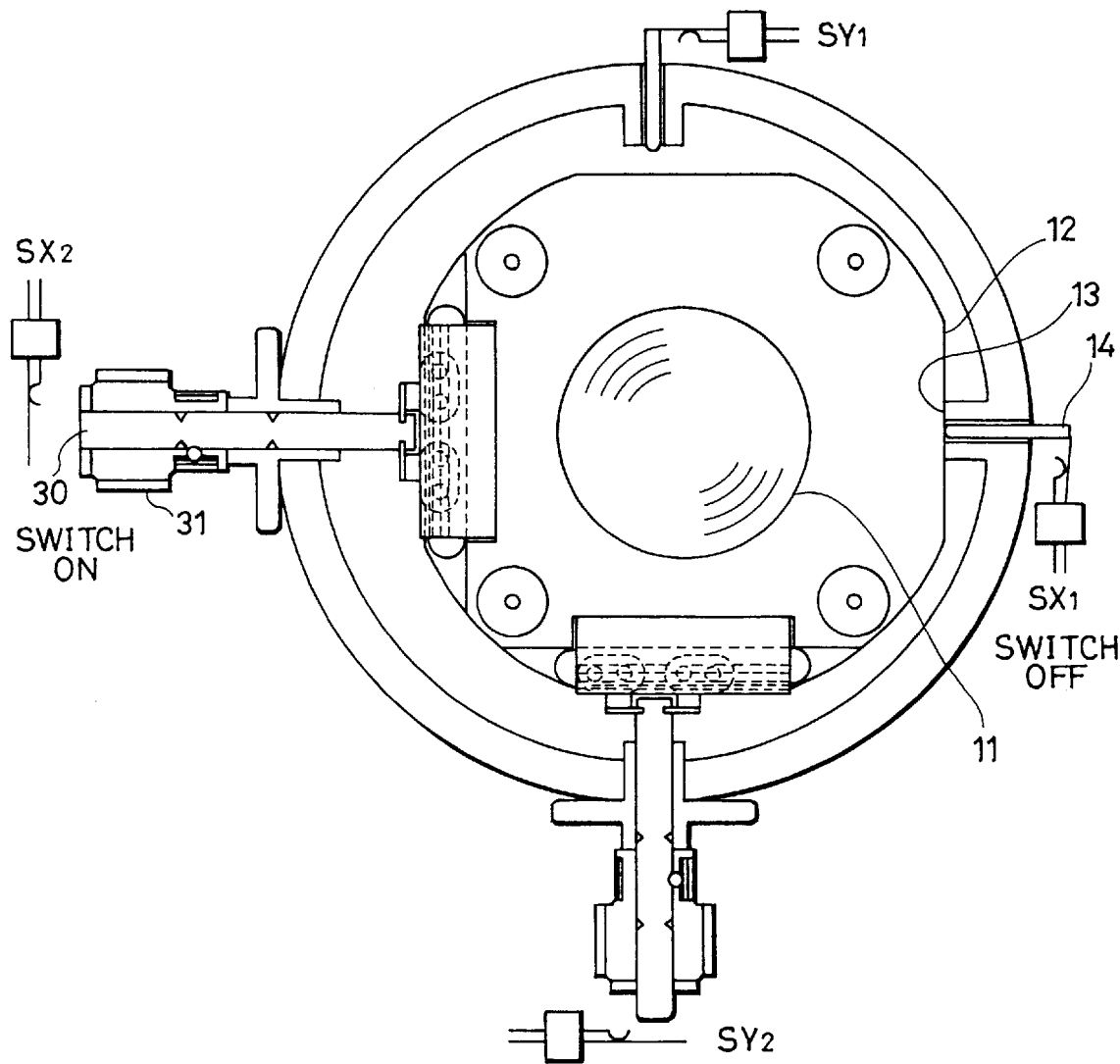
FIGS. 29 and 30 are diagrams showing driving mechanism of a correction lens which performs correction of camera-shake according to the present invention.
Figure 30:
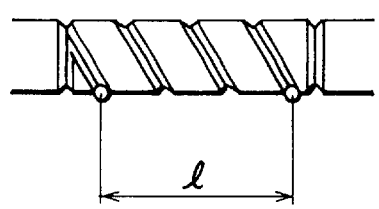

Subsequently, reset control will be described. FIG. 29 is a diagram showing driving mechanism of a correction lens. Referring to FIG. 29, the driving mechanism of correction lens comprises correction lens 11 and frame 12 holding correction lens 11. Holding frame 12 is provided with mechanical stopper 13 indicating movement limit of the correction lens and rod 14 which is forced by holding frame 12, before holding frame 12 gets in touch with mechanical stopper 13, into turning off limit switch SX1. When a drive pulse motor rotates, driving portion 31 rotates. Between driving portion 31 and driving shaft 30, there is provided a ball thread. The driving shaft is provided with a V-shaped groove and is driven in the straightforward direction led by the V-shaped groove as shown in FIG. 30. The driving takes place in the range of l as shown in the diagram. Meanwhile, the same applies also in the Y direction and, therefore, description thereof will be omitted. Further, since mechanism has no object in the present invention, detail description thereof will also be omitted.

Figure 31:
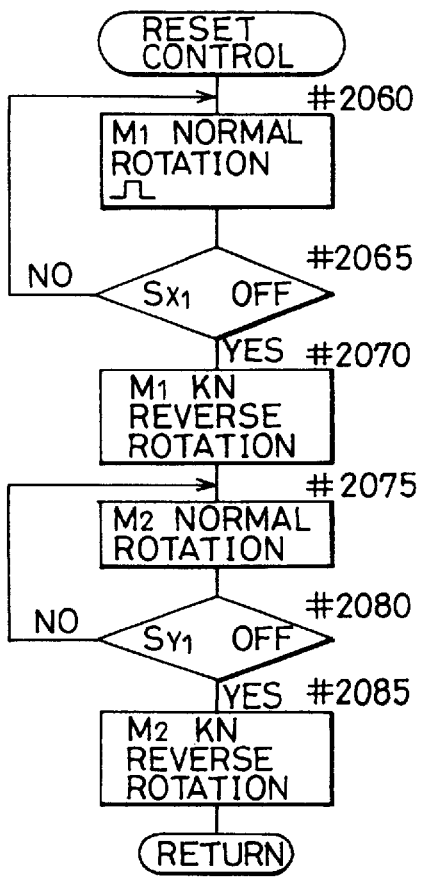
FIG. 31 is a flow chart diagram for explaining operation of the driving mechanism.

A routine of reset control in a driving mechanism of correction lens configured as described above is shown in FIG. 31. Referring to FIG. 31, first, a pulsed normal rotation signal is output to the circuit of pulsed motor M1 for the X direction to drive pulse motor M1 by one pulse. The correction lens is moved in the right direction of FIG. 29 and determination is made as to whether switch SX1 has been turned off or not (#2060 and #2065). When switch SX1 has not been turned off at step #2065, the program proceeds to step #2060 to further drive pulse motor M1 by one pulse. If switch SX1 has been turned off at step #2065, a signal for driving pulse motor M1 in the reverse direction by KN pulses is output. Thus, pulse motor M1 is rotated in the reverse direction and an initial position in the X direction is set (#2070). Then, setting of initial position in the Y direction is made.

Pulse motor M2 is rotated by one pulse and determination is made as to whether limit switch SY1 is turned off or not (#2080). If switch SY1 is not turned off at step #2080, pulse motor M2 is driven by additional one pulse. If switch SY1 is turned off, a signal for driving pulse motor M2 in the reverse direction by KN pulses is output to drive pulse motor M2 in such a manner. Thus, setting of initial position is completed (#2085) and the program returns to the main routine. Meanwhile, the above-mentioned constant KN is predetermined for the setting of initial positions in configuring the correction mechanism.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A brightness measuring apparatus comprising:
    a brightness measuring circuit repeatedly for measuring brightness of a subject and outputting data of measured brightness;
    subject-image-shake detecting circuit for detecting an amount of subject image shake;
    a comparator for comparing whether the detected amount of the subject-image shake detected by said subject-image-shake detecting circuit is greater than a predetermined value; and
    a control circuit for prohibiting update of said measured brightness data when the amount of subject-image shake is greater than said predetermined value.

2. The brightness measuring apparatus according to claim 1, wherein said brightness measuring circuit measures brightness of a plurality of areas including the brightness measuring area corresponding to the center of the subject and outputs the measured brightness value of only the center area as a spot brightness measuring data.

3. The brightness measuring apparatus according to claim 2, wherein said control circuit prohibits output of said spot brightness measuring data when the amount of subject-image-shake is greater than said predetermined value.

4. The brightness measuring apparatus according to claim 2, further comprising operating means indicating a spot brightness measuring mode and wherein said control circuit prohibits updating of said brightness measuring data when said spot brightness measuring mode is indicated and the amount of the subject-image-shake is greater than the predetermined value.

5. The brightness measuring apparatus according to claim 1, further comprising a correcting circuit for correcting the subject-image-shake based on output from the subject-image-shake detecting circuit.

6. A brightness measuring apparatus comprising:
    a brightness measuring circuit outputting brightness measuring data from brightness measuring area of the center of a subject as a spot measuring data;
    a subject-image-shake detecting circuit detecting an amount of subject-image-shake;
    a comparator determining whether the amount of the subject-image-shake detected by said subject-image-shake detecting circuit is greater than a predetermined value; and
    a control circuit prohibiting exposure control based on said spot brightness measuring data when said amount of subject-image-shake is greater than said predetermined value.

7. The brightness measuring apparatus according to claim 6, further comprising a correcting circuit correcting the subject-image-shake based on output from said subject-image-shake detecting circuit.

8. A method of measuring brightness of a subject comprising the steps of:
    repeatedly outputting brightness measuring data by measuring brightness of a subject;
    detecting an amount of subject-image-shake;
    determining whether the amount of detected subject-image-shake is greater than a predetermined value; and
    prohibiting updating of said brightness measuring data when the amount of subject-image-shake is greater than the predetermined value.

* * * * *